US012500344B2

(12) United States Patent
Yun et al.

(10) Patent No.: US 12,500,344 B2
(45) Date of Patent: Dec. 16, 2025

(54) WIDEBAND ANTENNA ARRANGED ON VEHICLE

(71) Applicant: LG ELECTRONICS INC., Seoul (KR)

(72) Inventors: Changwon Yun, Seoul (KR); Changil Kim, Seoul (KR); Yeomin Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 18/698,194

(22) PCT Filed: Oct. 6, 2021

(86) PCT No.: PCT/KR2021/013703
§ 371 (c)(1),
(2) Date: Apr. 3, 2024

(87) PCT Pub. No.: WO2023/058788
PCT Pub. Date: Apr. 13, 2023

(65) Prior Publication Data
US 2024/0322436 A1 Sep. 26, 2024

(51) Int. Cl.
*H01Q 9/04* (2006.01)
*H01Q 1/32* (2006.01)
(Continued)

(52) U.S. Cl.
CPC ............. *H01Q 9/0421* (2013.01); *H01Q 1/32* (2013.01); *H01Q 1/42* (2013.01); *H01Q 1/48* (2013.01); *H01Q 5/371* (2015.01); *H01Q 25/00* (2013.01)

(58) Field of Classification Search
CPC .......... H01Q 9/0421; H01Q 1/32; H01Q 1/42; H01Q 1/48; H01Q 5/371; H01Q 25/00;
(Continued)

(56) References Cited

U.S. PATENT DOCUMENTS 6,339,406 B1 1/2002 Nesic et al.
2006/0109179 A1 5/2006 Humpfer et al.
(Continued)

FOREIGN PATENT DOCUMENTS

KR 10-0363303 11/2002
KR 10-1152217 6/2012
(Continued)

OTHER PUBLICATIONS

PCT International Application No. PCT/KR2021/013507, International Search Report dated Jun. 29, 2022, 4 pages.
(Continued)

*Primary Examiner* — Seung H Lee
(74) *Attorney, Agent, or Firm* — LEE, HONG, DEGERMAN, KANG & WAIMEY

(57) ABSTRACT

The antenna module comprises: a PCB on which a transmission line is formed; and an antenna PCB coupled to the PCB, having a feeding line and an antenna pattern formed on a first surface thereof, and having a ground pattern formed on a second surface thereof. The ground pattern can comprise: a first ground pattern formed to have a first width, which is greater than the width of the feeding line in a region in which the feeding line is formed; and a second ground pattern, which extends from one end portion of the first ground pattern so as to be formed with a second width in a first axial direction and with a second length in a second axial direction. The ground pattern can further comprise a third ground pattern, which extends from one end portion of the second ground pattern to be bent so as to formed with a third width in the second axial direction and with a third length in the first axial direction.

20 Claims, 23 Drawing Sheets

(51) Int. Cl.

| | |
|---|---|
| ***H01Q 1/42*** | (2006.01) |
| ***H01Q 1/48*** | (2006.01) |
| ***H01Q 5/371*** | (2015.01) |
| ***H01Q 25/00*** | (2006.01) |

(58) Field of Classification Search
CPC ............ H01Q 1/38; H01Q 9/065; H01Q 9/42; H01Q 5/25; H01Q 5/40; H05K 2201/10098; H05K 1/0243; H04B 7/0413
See application file for complete search history.

(56) References Cited

U.S. PATENT DOCUMENTS

| | | | | |
|---|---|---|---|---|
| 2009/0079653 | A1 | 3/2009 | Semonov et al. | |
| 2009/0128418 | A1* | 5/2009 | Shih | H01Q 9/0442 343/700 MS |
| 2011/0012805 | A1 | 1/2011 | Huang | |
| 2011/0234467 | A1 | 9/2011 | Huang et al. | |
| 2015/0200445 | A1* | 7/2015 | Murphy | H01Q 1/243 343/702 |
| 2016/0352013 | A1* | 12/2016 | Fan | H01Q 13/10 |
| 2023/0009333 | A1* | 1/2023 | Yun | H04B 7/0413 |

FOREIGN PATENT DOCUMENTS

| | | | | |
|---|---|---|---|---|
| KR | 101152217 | B1 * | 6/2012 | H01Q 9/0407 |
| KR | 10-1991706 | | 9/2019 | |
| KR | 10-2021-0091175 | | 7/2021 | |

OTHER PUBLICATIONS

European Patent Office Application Serial No. 21960000.4, Search Report dated Jun. 10, 2025, 19 pages.

Tefiku et al., Design of Broad-Band and Dual-Band Antennas Comprised of Series-Fed Printed-Strip Dipole Pairs, XP-000959047, IEEE Transactions on Antennas and Propagation, IEEE, vol. 48, No. 6, Jun. 2000, 6 pages.

* cited by examiner (a)

(b)

(a)

(b)

(a)

(b)

(a)

(b)

(a)

(b)

(c)

(a)

(b)

(c)

WIDEBAND ANTENNA ARRANGED ON VEHICLE

CROSS-REFERENCE TO RELATED APPLICATION

This application is the National Stage filing under 35 U.S.C. 371 of International Application No. PCT/KR2021/013703, filed on Oct. 6, 2021, the contents of which are hereby incorporated by reference herein its entirety.

TECHNICAL FIELD

This specification relates to a wideband antenna disposed in a vehicle. One particular implementation relates to an antenna module having a wideband antenna that is capable of operating in various communication systems, and to a vehicle having the same.

BACKGROUND ART

A vehicle may perform wireless communication services with other vehicles or nearby objects, infrastructures, or a base station. In this regard, various communication services may be provided using Long Term Evolution (LTE) communication, 5G communication, or WiFi communication technology.

In order to provide these various wireless communication services in a vehicle, an antenna may be disposed on a glass of the vehicle, above or below a roof of the vehicle. When the antenna is disposed on the glass of the vehicle, it may be implemented with a transparent antenna material. Meanwhile, when the antenna is disposed above or below the roof of the vehicle, an effect on a vehicle body and the roof of the vehicle may cause a change in antenna performance.

In this regard, there is a problem in that the vehicle body and the vehicle roof are formed of a metallic material to block radio waves. Accordingly, a separate antenna structure may be disposed above the vehicle body or the roof. Or, when the antenna structure is disposed below the vehicle body or roof, a portion of the vehicle body or roof corresponding to a region where the antenna structure is disposed may be formed of a non-metallic material.

Meanwhile, in order to provide WiFi communication services in a vehicle, a WiFi communication antenna needs to be provided in the vehicle. In relation to these WiFi communication services, the vehicle WiFi antenna needs to be configured to operate in a 5 GHz band and a 6 GHz band in addition to a 2.4 GHz band. In this regard, existing antenna elements are implemented as resonance antenna elements with a limited bandwidth, so there is a problem in that bandwidth characteristics are limited.

In addition, a vehicle antenna needs to form an antenna beam within a predetermined angle range in a horizontal direction rather than a vertical direction. In this regard, an antenna beam pattern formed within a predetermined angle range in the horizontal direction may be referred to as a low elevation beam pattern. Meanwhile, there is a problem in that no specific structure for configuring the antenna element has been proposed to implement such a low elevation beam pattern.

DISCLOSURE OF INVENTION

Technical Problem

This specification is directed to solving the aforementioned problems and other drawbacks. In addition, another aspect of this specification is to provide a wideband antenna element capable of performing a wideband operation while being disposed in a vehicle.

Another aspect of this specification is to provide a wideband antenna element capable of providing WiFi 6 and WiFi 7 communication services while being disposed in a vehicle.

Another aspect of this specification is to provide an antenna structure capable of implementing a low elevation beam pattern while being disposed in a vehicle.

Another aspect of this specification is to provide a high-efficiency wideband antenna element having a high antenna gain while operating in a wide bandwidth.

Another aspect of this specification is to maintain antenna performance at a predetermined level and maintain a low elevation beam pattern even in a case where the exterior of a vehicle body or roof is made of a metallic material.

Another aspect of the present disclosure is to improve antenna performance of an antenna system while maintaining a height of the antenna system at a predetermined level or less as well as maintaining a low elevation beam pattern.

Another aspect of the present disclosure is to provide a structure for mounting an antenna system, which is capable of operating in a broad frequency band to support various communication systems, to a vehicle.

Solution to Problem

In order to achieve the foregoing or other objectives, an antenna module mounted on a vehicle according to an embodiment is provided. The antenna module may include a PCB having a transmission line disposed thereon; and an antenna PCB coupled to the PCB, the antenna PCB having a feed line and an antenna pattern disposed on a first side and a ground pattern disposed on a second side. The ground pattern may include a first ground pattern disposed in a region where the feed line is disposed to have a first width larger than a width of the feed line; and a second ground pattern extending from one end portion of the first ground pattern to be disposed to have a second width in a first axis direction and a second length in a second axis direction. The ground pattern may further include a third ground pattern extending in a bending manner from one end portion of the second ground pattern to be disposed to have a third width in the second axis direction and a third length in the first axis direction.

According to an embodiment, the antenna pattern may include a connection pattern connected to the feed line on the first side; and a first extended pattern extending from a first point of the connection pattern in one direction on a first axis. The antenna pattern may further include a second extended pattern extending from a second point of the connection pattern in the other direction on the first axis.

According to an embodiment, the first extended pattern may be disposed to have a first length from a first point of the connection pattern in one direction on the first axis, and configured to radiate a wireless signal in a first band.

According to an embodiment, the second extended pattern may be disposed to have a second length from a second point of the connection pattern in the other direction on the first axis, and configured to radiate a wireless signal in a second band higher than the first band.

According to an embodiment, a point where the third ground pattern is bent may be a point corresponding to the second point where the second extended pattern is disposed. The second extended pattern may be disposed to have a first length in one direction on the first side of the antenna PCB, and the third ground pattern may be disposed to have a third length in the other direction on the second side of the antenna PCB.

According to an embodiment, the direction of a first current formed in the second extended pattern and the direction of a second current formed in the third ground pattern may be formed in the same direction. The second extended pattern and the third ground pattern may be configured to operate in a third band different from the second band by the first current and the second current.

According to an embodiment, the antenna PCB may be disposed perpendicular to the PCB disposed in parallel to the bottom cover.

According to an embodiment, the antenna module may be configured to radiate an antenna beam tilted by a predetermined angle with respect to a bottom surface of the bottom cover by the antenna PCB in front and rear directions of the antenna PCB.

According to an embodiment, the antenna PCB may form a first beam at an angle spaced apart by a predetermined angle with respect to the PCB by the connection pattern, the first extended pattern, and the second extended pattern disposed on the first side of the antenna PCB. The antenna PC may form a second beam at an angle spaced apart by a predetermined angle with respect to the PCB by the ground pattern disposed on the second side of the antenna PCB. An antenna beam tilted by a predetermined angle with respect to a bottom surface of the bottom cover by the first beam and the second beam may be radiated in front and rear directions of the antenna PCB.

According to an embodiment, the antenna pattern disposed on the first side of the antenna PCB and the ground pattern disposed on the second side of the antenna PCB may be interconnected by a vertical connection structure.

According to an embodiment, the second extended pattern and the third ground pattern may be connected vertically by a via hole at one point in a region where the antenna pattern and the ground pattern overlap.

An antenna module mounted on a vehicle according to another aspect of this specification may be provided. The antenna module may include a PCB having a transmission line disposed thereon; a bottom cover in which the PCB is disposed; a top cover fastened to the bottom cover to accommodate the PCB therein; and an antenna PCB coupled to the PCB, the antenna PCB having a feed line and an antenna pattern disposed on a first side and a ground pattern disposed on a second side.

According to an embodiment, the ground pattern may include a first ground pattern disposed in a region where the feed line is disposed to have a first width larger than a width of the feed line; a second ground pattern spaced apart from one end portion of the first ground pattern and disposed to have a predetermined length in a first axis direction parallel to the first ground pattern; a third ground pattern extending in a bending manner from one end portion of the second ground pattern to be disposed perpendicular to the second ground pattern; and a fourth ground pattern extending in a bending manner from one end portion of the third ground pattern to be disposed perpendicular to the third ground pattern.

According to an embodiment, the antenna pattern may include a connection pattern connected to the feed line on the first side; and a first extended pattern extending from a first point of the connection pattern in one direction on a first axis. The antenna pattern may further include a second extended pattern extending from a second point of the connection pattern in the other direction on the first axis.

According to an embodiment, the first extended pattern may be disposed to have a first length from a first point of the connection pattern in one direction on the first axis, and configured to radiate a wireless signal in a first band.

According to an embodiment, the second extended pattern may be bent at one end portion of the connection pattern, disposed to have a second length in the other direction on the first axis, and configured to radiate a wireless signal in a second band higher than the first band.

According to an embodiment, the fourth ground pattern may extend from the third ground pattern at a point corresponding to the first point where the first extended pattern is disposed. The fourth ground pattern may be disposed in the other direction on the first axis.

According to an embodiment, a point where the second ground pattern is disposed may be a point corresponding to the second point where the second extended pattern is disposed. The second extended pattern may be disposed to have a first length in one direction on the first side of the antenna PCB, and the second ground pattern may be disposed to have a second length in the other direction on the second side of the antenna PCB.

According to an embodiment, the direction of a first current formed in the second extended pattern and the direction of a second current formed in the second ground pattern may be formed in the same direction. The second extended pattern and the second ground pattern may be configured to operate in a third band higher than the second band by the first current and the second current.

A vehicle having an antenna module according to another aspect of this specification may include an antenna module disposed below a roof of the vehicle; and a processor disposed inside or outside the antenna module, and configured to communicate with at least one of an adjacent vehicle, a road side unit (RSU), and a base station. The antenna modules may include a PCB having a transmission line disposed thereon; a bottom cover in which the PCB is disposed; a top cover fastened to the bottom cover to accommodate the PCB therein; and an antenna PCB coupled to the PCB, the antenna PCB having a feed line and an antenna pattern disposed on a first side and a ground pattern disposed on a second side.

According to an embodiment, the ground pattern may include a first ground pattern disposed in a region where the feed line is disposed to have a first width larger than a width of the feed line; a second ground pattern extending from one end portion of the first ground pattern or disposed to be spaced apart therefrom; and a third ground pattern extending in a bending manner from one end portion of the second ground pattern to be disposed perpendicular to the second ground pattern.

According to an embodiment, the antenna pattern may include a connection pattern connected to the feed line on the first side; and a first extended pattern extending from a first point of the connection pattern in one direction on a first axis. The antenna pattern may include a second extended pattern extending from a second point of the connection pattern in the other direction on the first axis.

According to an embodiment, the second ground pattern may extend from one end portion of the first ground pattern, and may be disposed to have a second width in a first axis direction and a second length in a second axis direction. The third ground pattern may be disposed to have a third width in the second axis direction and a third length in the first axis direction. The first extended pattern may be disposed to have a first length from a first point of the connection pattern in one direction on the first axis, and configured to radiate a wireless signal in a first band. The second extended pattern may be bent at one end portion of the connection pattern, disposed to have a second length in the other direction on the first axis, and configured to radiate a wireless signal in a second band higher than the first band. The direction of a first current formed in the second extended pattern and the direction of a second current formed in the third ground pattern may be formed in the same direction. The second extended pattern and the third ground pattern may be configured to operate in a third band higher than the second band by the first current and the second current.

According to an embodiment, the ground pattern may further include a fourth ground pattern extending in a bending manner from one end portion of the third ground pattern to be disposed perpendicular to the third ground pattern. The second ground pattern may be spaced apart from one end portion of the first ground pattern and disposed to have a predetermined length in a first axis direction parallel to the first ground pattern. The fourth ground pattern may extend from the third ground pattern at a point corresponding to the first point where the first extended pattern is disposed, and the fourth ground pattern may be disposed in the other direction on the first axis. The direction of a first current formed in the second extended pattern and the direction of a second current formed in the second ground pattern may be formed in the same direction. The second extended pattern and the third ground pattern may be configured to operate in a third band higher than the second band by the first current and the second current.

According to an embodiment, the antenna module may include a first antenna and a second antenna consisting of the slot radiator and the second radiator. The processor may control to perform multi-input multi-output (MIMO) in a first band through the first antenna and the second antenna. The processor may control to perform multi-input multi-output (MIMO) in a second band higher than the first band through the first antenna and the second antenna.

Advantageous Effects of Invention

The technical effects of such an antenna module having a wideband antenna element in a vehicle and a vehicle equipped with the antenna module will be described as follows.

According to this specification, a wideband antenna structure consisting of an antenna pattern and a ground pattern may be presented to perform a wideband operation while being disposed in a vehicle.

According to this specification, a wideband antenna structure disposed in a vehicle may be presented to provide WiFi 6 and WiFi 7 communication services in the vehicle.

According to this specification, a ground pattern may be disposed in a lower region of the antenna pattern to provide a vehicle antenna structure capable of implementing a low elevation beam pattern.

According to this specification, an antenna element may be implemented on a PCB and a separate antenna board capable of optimizing antenna performance to provide a high-efficiency wideband antenna element with high antenna gain while operating in a wide bandwidth.

According of this specification, it may be possible to maintain antenna performance at a predetermined level and maintain a low elevation beam pattern even in a case where the exterior of a vehicle body or roof is made of a metallic material.

According to this specification, it may be possible to improve antenna performance of an antenna system while maintaining a height of the antenna system at a predetermined level or less as well as maintaining a low elevation beam pattern.

According to this specification, a structure for mounting an antenna system capable of operating in a wideband on a vehicle to support various communication systems may be presented.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1A:
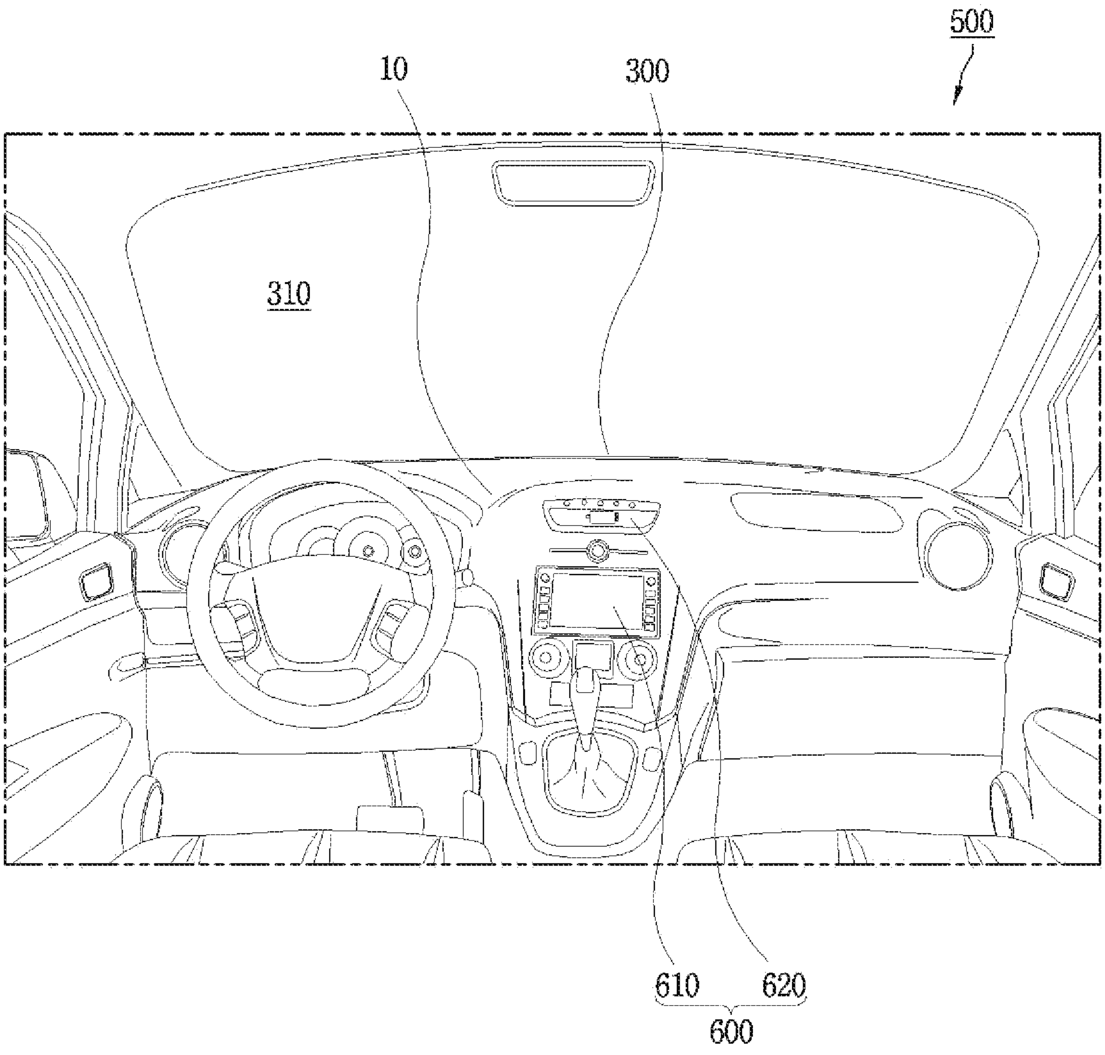
FIG. 1A is a diagram illustrating an internal configuration of a vehicle in accordance with one example.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer elements, functions, or steps may likewise be utilized.

An antenna system described herein may be mounted on a vehicle. Configurations and operations according to implementations may also be applied to a communication system, namely, antenna system mounted on a vehicle. In this regard, the antenna system mounted in the vehicle may include a plurality of antennas, and a transceiver circuit and a processor that control the plurality of antennas.

Figure 1B:
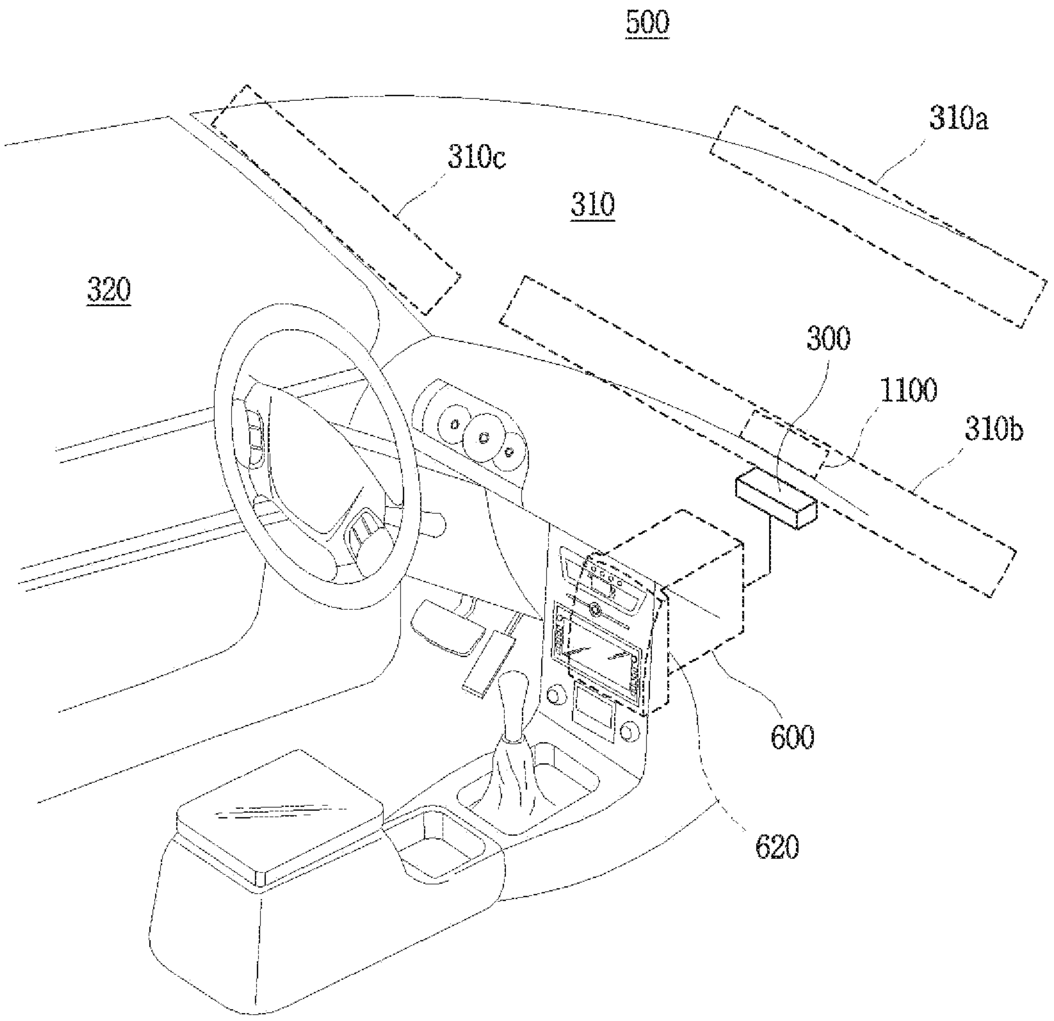
FIG. 1B is a lateral view illustrating the vehicle interior in accordance with the one example.

FIG. 1A is a diagram illustrating an internal configuration of a vehicle in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed in at least one of an upper region 310*a*, a lower region 310*b*, and a side region 310*c* of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310*b* of the front window 310, it may be operably coupled to a TCU 300 disposed inside the vehicle. When the antenna assembly 1100 is disposed at the upper region 310*a* or the side region 310*c* of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may have the same meaning as V2X sidelink or NR V2X or may have, in a broader sense, a meaning including V2X sidelink or NR V2X.

V2X communication may be applicable to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for employing the term RSU in association with the 3GPP specifications is to read relevant documents in an easier manner in the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. A V2P Service is a type of V2X service, where one party is a vehicle whereas the other party is an entity belonging to an infrastructure. A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
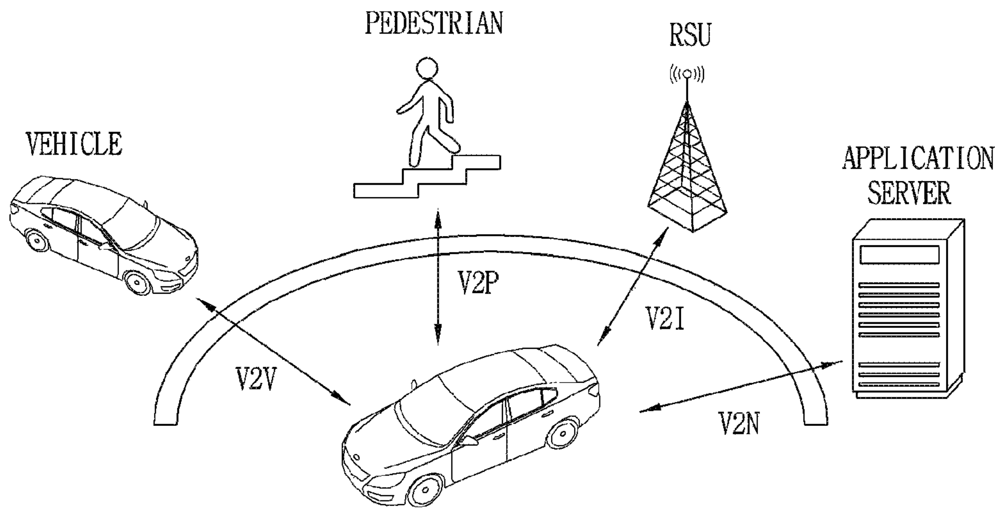
FIG. 2A is a diagram illustrating a type of V2X application.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use "cooperative awareness" to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

Support for V2V and V2X services has been introduced in LTE during Releases 14 and 15, in order to expand the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. This information allows the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced Driving enables semi-automated or full-automated driving. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE's V2X communication in both LTE SL and NR SL. 2) In Scenario 2, ng-eNB provides control/configuration for UE's V2X communication in both LTE SL and NR SL. 3) In Scenario 3, eNB provides control/configuration for UE's V2X communication in both LTE SL and NR SL. On the other hand, 4) in Scenario 4, the UE's V2X communication in the LTE SL and the NR SL is controlled/configured by Uu while the UE is configured with EN-DC. 5) In Scenario 5, the UE's V2X communication in the LTE SL and the NR SL is controlled/configured by Uu while the UE is configured in NE-DC. 6) In Scenario 6, the UE's V2X communication in the LTE SL and the NR SL is controlled/configured by Uu while the UE is configured in NGEN-DC.

Figure 2B:
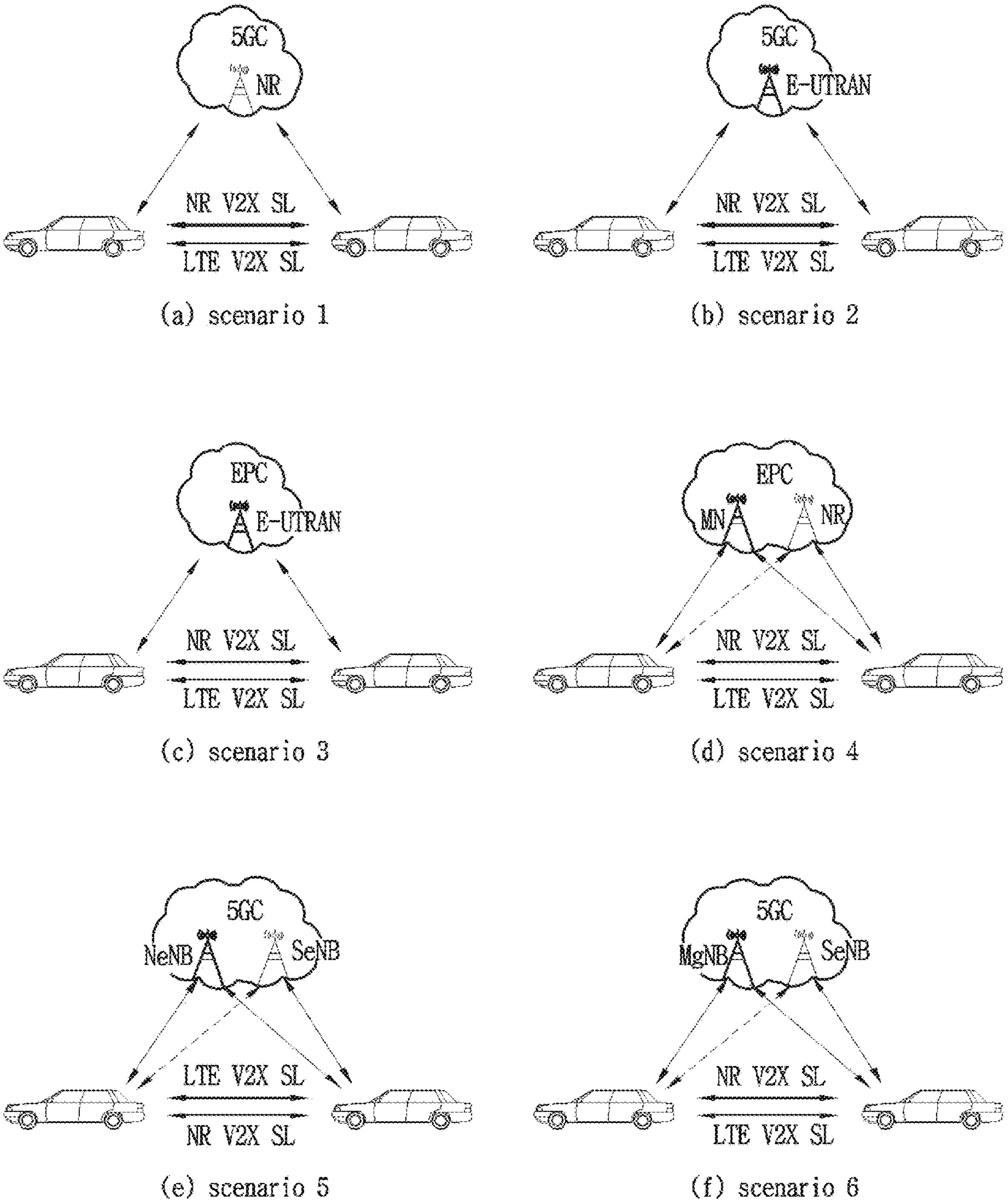
FIG. 2B is a view illustrating a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
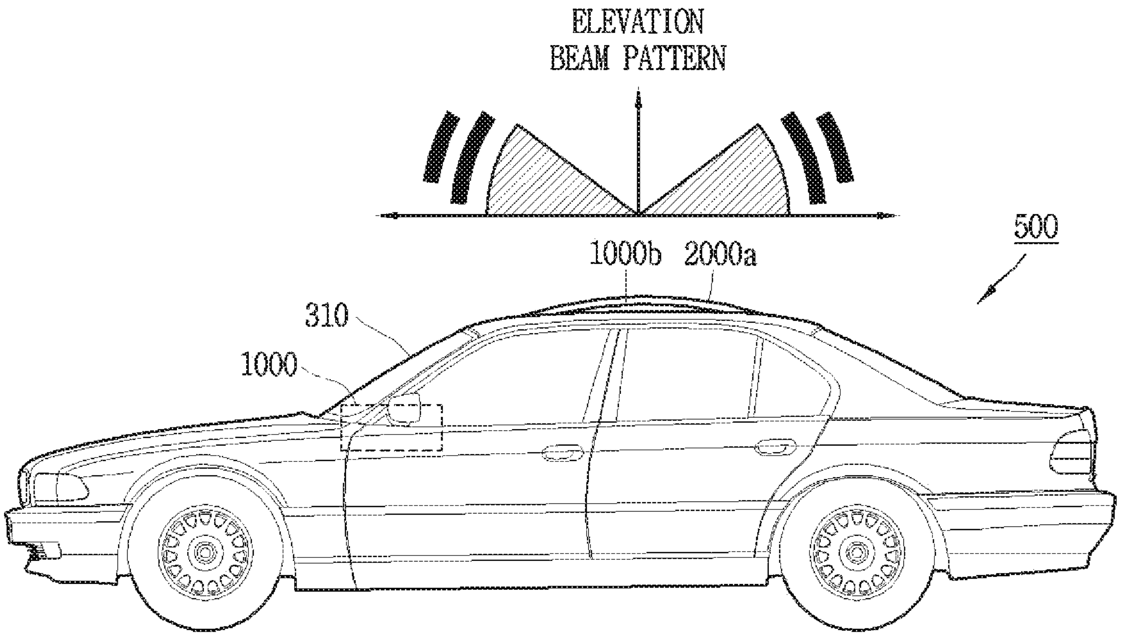
FIGS. 3A to 3C are views illustrating a structure for mounting an antenna system in a vehicle, to which the antenna system is mounted.
Figure 3B:
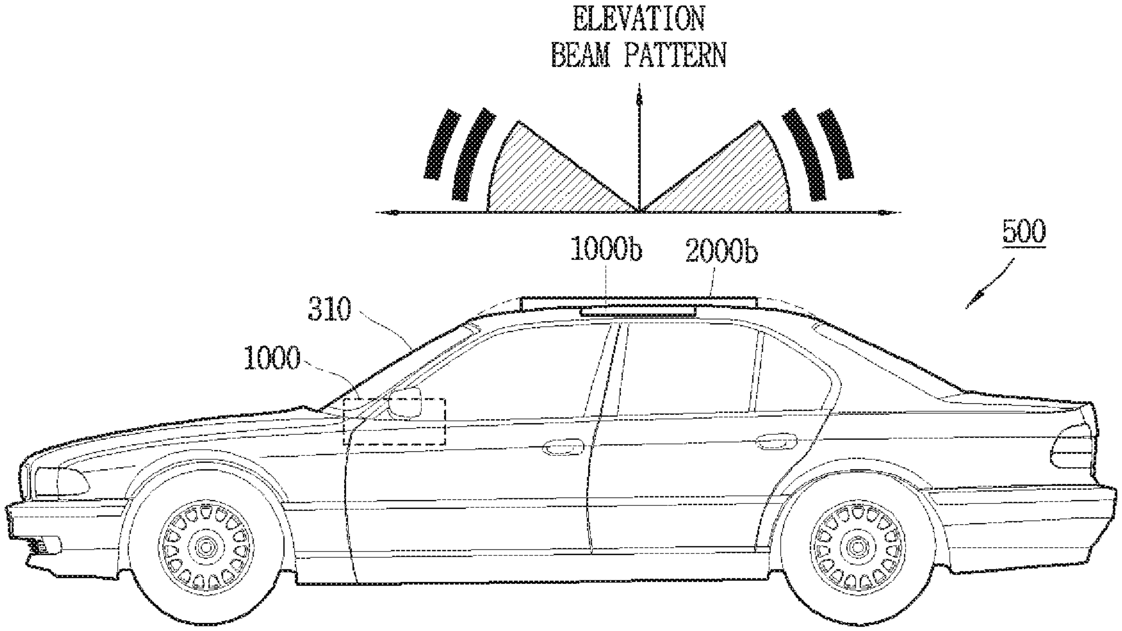
Figure 3C:
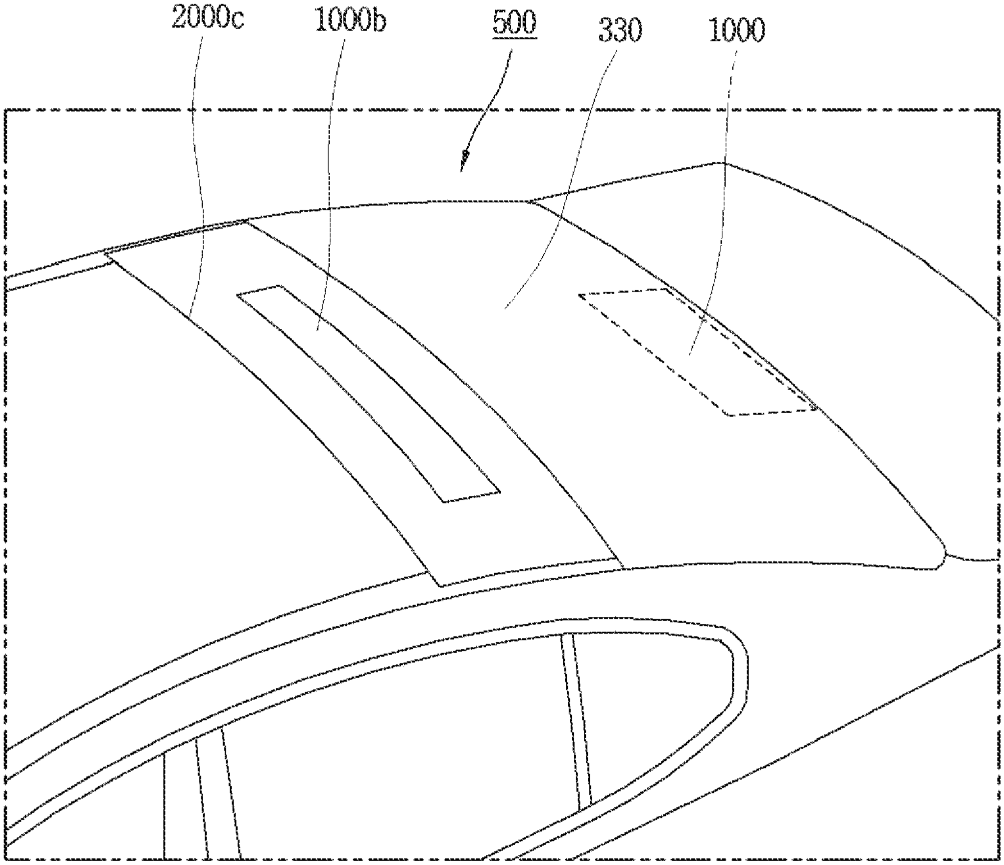

FIGS. 3A to 3C are views illustrating an example of a structure for mounting an antenna system on a vehicle, which includes the antenna system mounted on the vehicle. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000*b* corresponding to an external antenna may be disposed on the roof of the vehicle. In FIG. 3A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 3B, the antenna system 1000 implemented as the transparent antenna may be disposed on the front window 310 of the vehicle and inside the vehicle. One the other hand, the second antenna system 1000*b* corresponding to the external antenna may be disposed within a roof structure of the vehicle and at least part of the roof structure may be made of a non-metallic material. At this time, the roof structure 2000*b* of the vehicle except for the at least part made of the non-metallic material may be made of a dielectric material through which radio signals are transmitted/received between the antenna system 1000*b* and the base station.

Referring to FIG. 3C, the antenna system 1000 implemented as the transparent antenna may be disposed on the rear window 330 of the vehicle and inside the vehicle. The second antenna system 1000*b* corresponding to the external antenna may be disposed within the roof frame of the vehicle, and at least part of the roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000 mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 4:
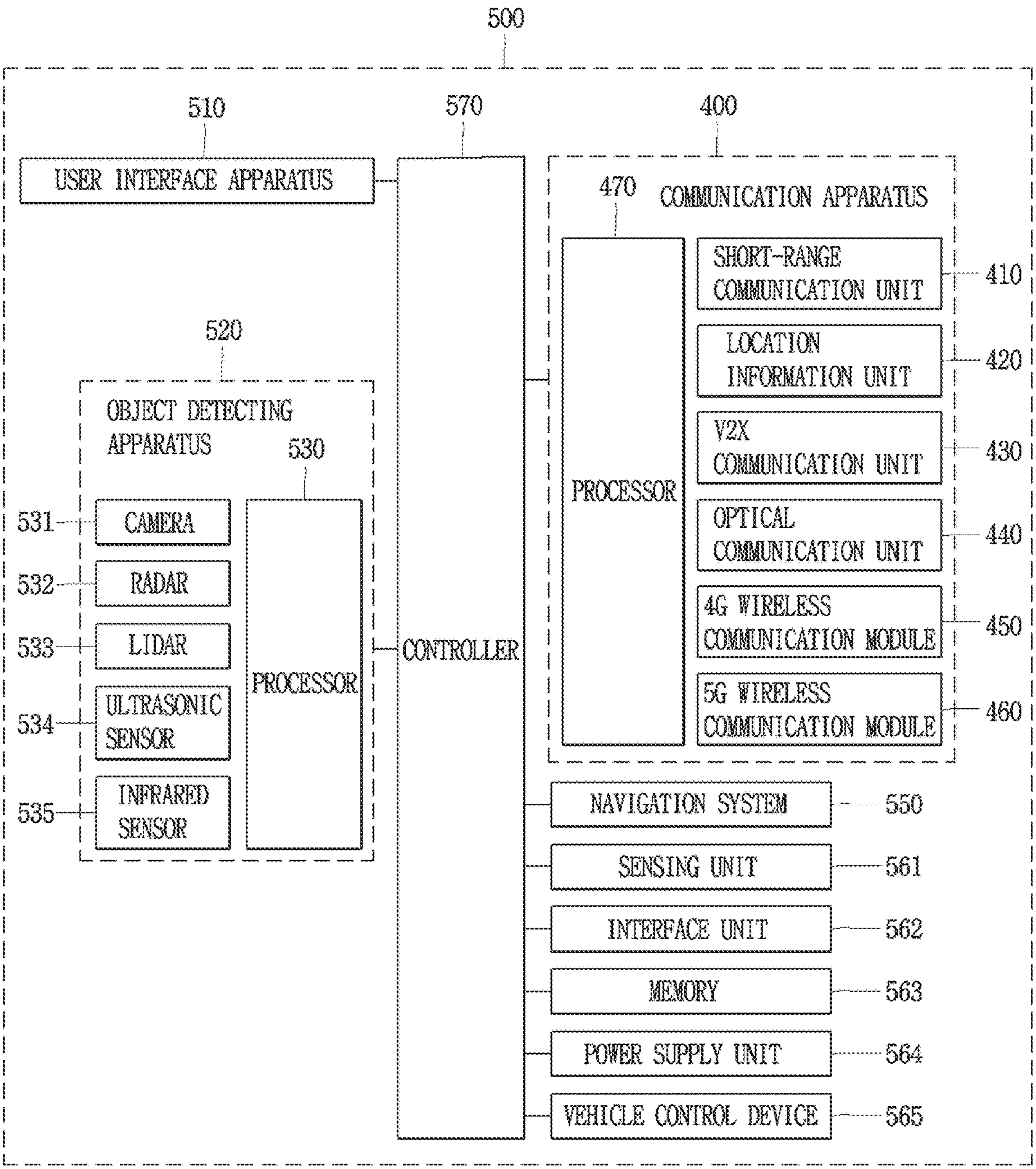
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided by an external device.

When the vehicle 500 travels in the autonomous mode, the autonomous vehicle 500 may travel under the control of an operation system. For example, the autonomous vehicle 500 may travel based on information, data or signal generated in a driving system, a parking exit (parking-lot leaving) system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface apparatus 510, an object detecting apparatus 520, a navigation system 550, and a communication apparatus 400. The vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained herein or may not include some of those components to be explained herein.

The user interface apparatus 510 may be an apparatus for communication between the vehicle 500 and a user. The user interface apparatus 510 may receive a user input and provide information generated in the vehicle 500 to the user. The vehicle 500 may implement user interfaces (UIs) or user experiences (UXs) through the user interface apparatus 510.

The object detecting apparatus 520 may be a device for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include an optical transmission part for converting an electric signal into an optical signal and transmitting the optical signal to the outside, and an optical reception part for converting the received optical signal into the electric signal. According to an embodiment, the optical transmission part may be formed integrally with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, uplink (UL) multi-input multi-output (MIMO) may be performed by a plurality of 4G transmission signals transmitted to the 4G base station. In addition, downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. For instance, the 4G base station and the 5G base station may have a Non-Stand-Alone (NSA) architecture. Alternatively, the 5G base station may be disposed in a Stand-Alone (SA) structure at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, 5G and 4G networks may use the same frequency band, and this may be referred to as LTE re-farming. In some examples, a sub-6 frequency band, which is a range of 6 GHz or less, may be used as the 5G frequency band. On the other hand, a millimeter-wave (mmWave) range may be used as the 5G frequency band to perform wideband high-speed communication. When the mm Wave band is used, the electronic device may perform beamforming for coverage expansion of an area where communication with a base station is possible.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity to the 4G base station and the 5G base station may be referred to as EUTRAN NR DC (EN-DC). When the 4G base station and 5G base station are disposed in a co-located structure, throughput improvement may be achieved by inter-Carrier Aggregation (inter-CA). Therefore, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission speed improvement and communication system convergence, carrier aggregation (CA) using at least one of the 4G wireless communication module 450 and 5G wireless communication module 460 and the Wi-Fi communication module 113. In this regard, 4G+WiFi carrier aggregation (CA) may be performed using the 4G wireless communication module 450 and the Wi-Fi communication module 113. Or, 5G+WiFi CA may be performed using the 5G wireless communication module 460 and the Wi-Fi communication module.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

The processor 470 of the communication apparatus 400 may correspond to a modem. In this regard, the RFIC and the modem may be referred to as a first controller (or a first processor) and a second controller (a second processor), respectively. Meanwhile, the RFIC and the modem may be implemented as physically separate circuits. Alternatively, the RFIC and the modem may be logically or functionally distinguished from each other on one physical circuit. The modem may perform control and signal processing for the transmission and reception of signals through different communication systems through the RFIC. The modem 1400 may acquire control information from a 4G base station and/or a 5G base station. Here, the control information may be received through a physical downlink control channel (PDCCH), but the present disclosure is not limited thereto.

The modem may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4, the antenna module mounted on the vehicle may be disposed inside the vehicle, on the roof of the vehicle, inside the roof, or inside the roof frame. In this regard, the antenna system disclosed herein may be configured to operate in a low band (LB), a mid band (MB), and a high band (HB) of a 4G LTE system and in a sub-6 band of a 5G NR system. In addition, the antenna system disclosed herein may be configured to operate in a 2.4 GHz band, a 5.5 GHz band, and a 6.5 GHz band to provide Wi-Fi 6 and Wi-Fi 7 communication services.

Figure 5:
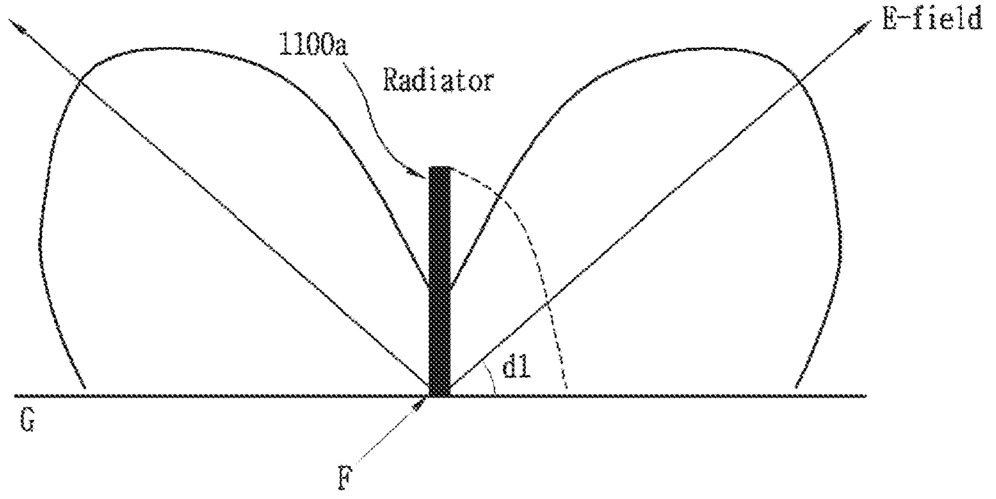
FIG. 5 shows diagrams in which radiation patterns depending on whether a ground is disposed on a rear side of an antenna element are compared when the antenna element is disposed perpendicular to a horizontal plane.
Figure 5:
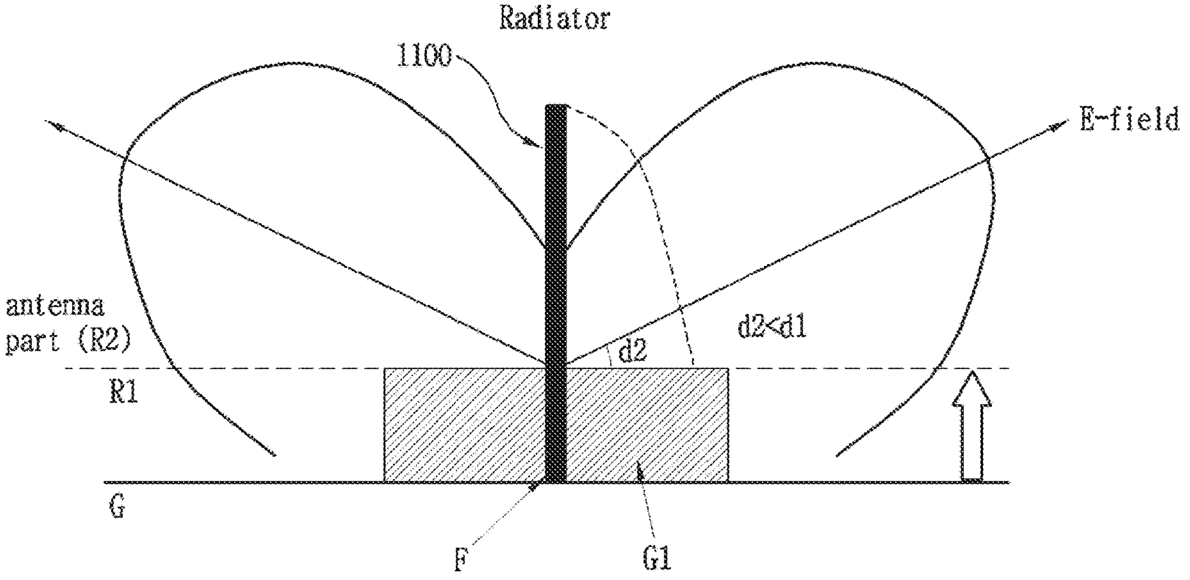

Hereinafter, a wideband antenna provided in an antenna module that can be disposed in a vehicle according to this specification will be described. In this regard, FIG. 5 shows diagrams in which radiation patterns depending on whether a ground is disposed on a rear side of an antenna element are compared when the antenna element is disposed perpendicular to a horizontal plane. (a) of FIG. 5 shows a structure in which no ground is disposed on a rear side of the antenna element and a resultant radiation pattern. (b) of FIG. 5 shows a structure in which a ground is disposed on a rear side of the antenna element and a resultant radiation pattern.

Regarding the structures of (a) and (b) of FIG. 5, the ground G may be a ground disposed in a metal structure inside a roof 2000*a* to 2000*c* of the vehicle of FIGS. 3A to 3C. Referring to (a) of FIG. 5, an antenna element 1100*a* may be disposed between a roof 2000*a* to 2000*c* of the vehicle and a ground inside the roof. Accordingly, a radiation pattern by the antenna element 1100*a* is formed in a sky direction with respect to a horizontal plane. That is, a beam peak of the radiation pattern by the antenna element 1100*a* may be formed at an angle d1 with respect to the horizontal plane.

Referring to (b) of FIG. 5, a beam peak of the radiation pattern by the antenna element 1100 may be formed at an angle d2 with respect to the horizontal plane. The beam peak angle d2 by the antenna element 1100 in (b) of FIG. 5 is formed at an angle smaller than the beam peak angle d1 by the antenna element 1100*a* in (a) of FIG. 5.

In this regard, a ground G1 is disposed on a rear portion of the antenna element 1100. Therefore, a first region R1 consisting of the antenna pattern and the ground G1 disposed in a lower region of the antenna element 1100 constitutes a transmission line. Accordingly, an antenna part that substantially operates as a radiator is disposed in a second region R2, which is an upper region of the first region R1 constituting the transmission line. Therefore, a point where the ground in (b) of FIG. 5 is disposed is located higher than a point where the ground in (a) of FIG. 5 is disposed. Accordingly, the radiation pattern of the antenna element 1100 in (b) of FIG. 5 has a lower elevation radiation characteristic than the antenna element 1100*a* in (a) of FIG. 5.

Therefore, the antenna pattern corresponding to the radiator disposed in the antenna part is disposed in the second region R2, which is an upper region than a power feeder F disposed in the first region R1. Meanwhile, the ground G1 disposed on the rear portion of the antenna element 1100 may be connected to the ground G of the PCB 1200 disposed on a horizontal plane. In this regard, a width of a ground pattern constituting the ground G1 may be implemented to be above about twice or above three times a width of a conductive pattern on a front side on which the antenna element 1100 is disposed. The ground G1 may be frequency-selectively connected to the ground G of the PCB 1200 through a filter.

As described above, as the height of a point where the ground is disposed increases as shown in (b) of FIG. 5, a radiation pattern of the antenna element 1100 in (b) of FIG. 5 has a lower elevation radiation characteristic than that of the antenna element 1100*a* in (a) of FIG. 5. Meanwhile, a vehicle antenna module in which the antenna element 1100*a*, 1100 in (a) and (b) of FIG. 5 is disposed may perform a vehicle communication and control function, and may be referred to as a vehicle telemetric control unit (TCU). In this regard, it may be configured to connect the vehicle TCU and a separate shark fin antenna with a coaxial cable, but due to an increase in number of antennas and an increase in design requirements, but this specification proposes a structure in which antenna elements are disposed within a module.

A vehicle antenna requires a low elevation radiation pattern. However, due to a location where the antenna is mounted on the vehicle and a structure of the TCU, there is a problem in that the radiation pattern is formed at a relatively high angle with respect to a horizontal plane, so that the beam peak to be directed toward the sky. Therefore, in order to implement a low elevation radiation characteristic of a vehicle antenna, a height of the antenna must be structurally increased. Meanwhile, this specification proposes a structure of a wideband antenna element capable of implementing a low elevation radiation characteristic while implementing a low-profile structure that maintains an overall height of the antenna below a predetermined height.

Figure 6:
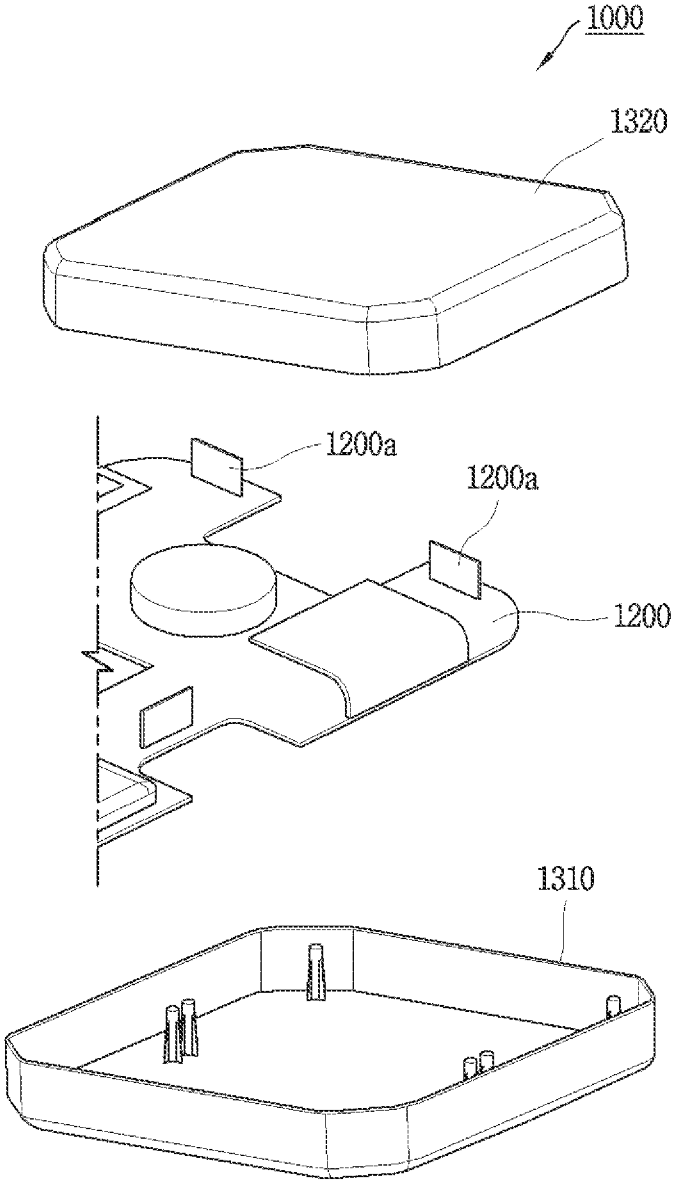
FIG. 6 shows an exploded view of an antenna module having a wideband antenna according to this specification.

FIG. 6 shows an exploded view of an antenna module having a wideband antenna according to this specification. Meanwhile, FIGS. 7 and 8 are an exploded view and a front view showing an antenna pattern and a ground pattern of the wideband antenna according to this specification.

Figure 7:
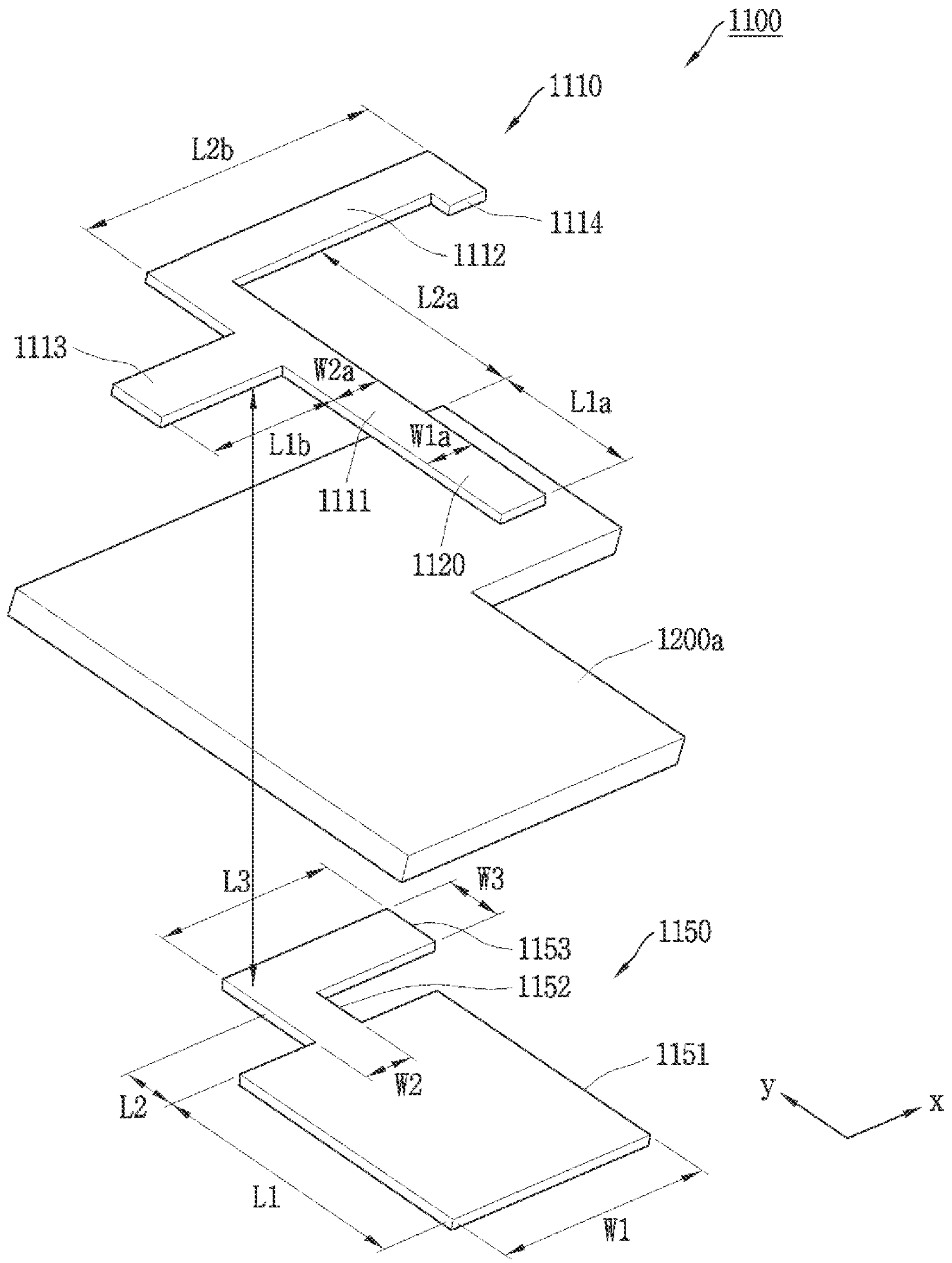
FIGS. 7 and 8 are an exploded view and a front view showing an antenna pattern and a ground pattern of the wideband antenna according to this specification.
Figure 8:
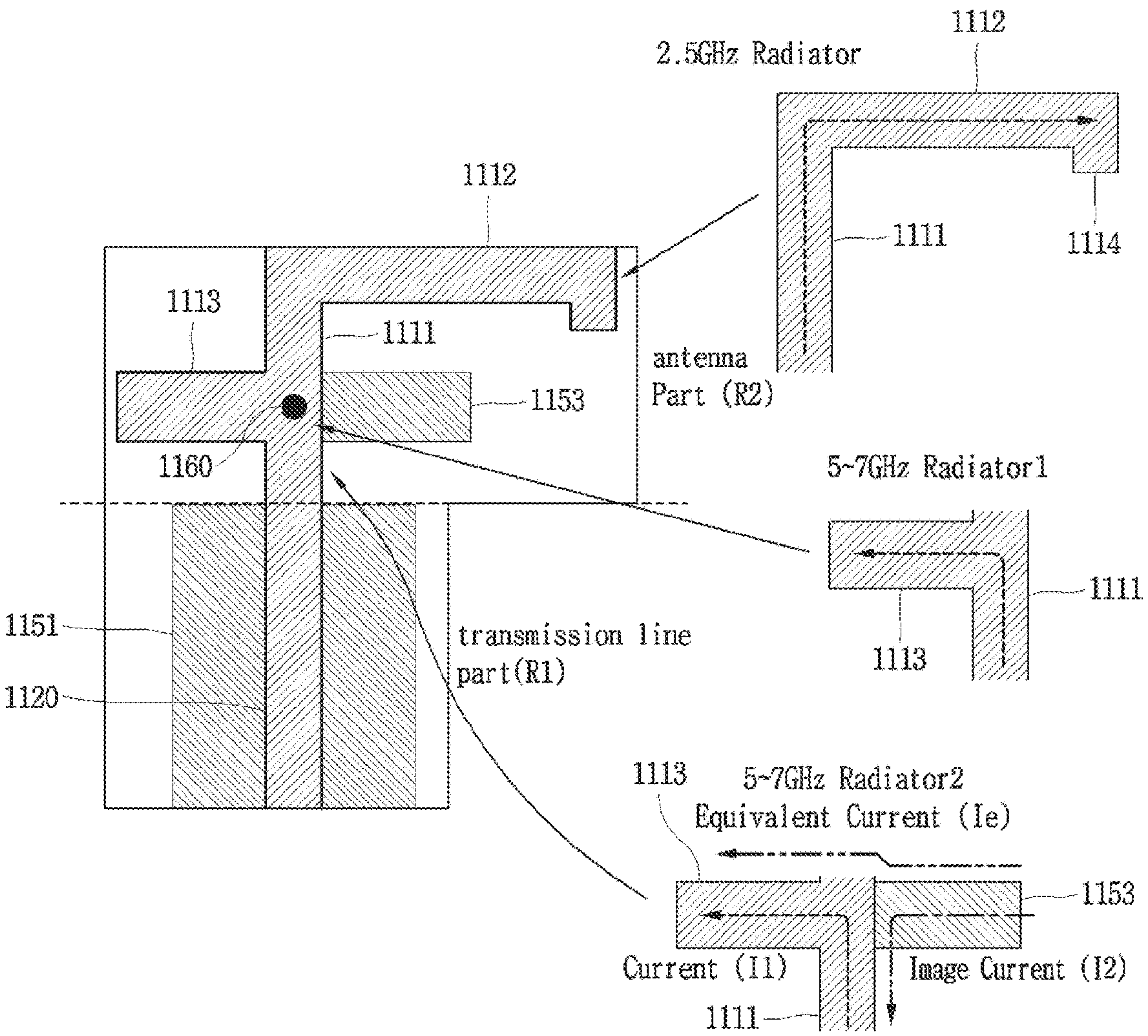

Referring to FIGS. 6 to 8, a main feature of the antenna structure presented herein is that 1) a radiator part that may be implemented on both sides of the PCB to form an omni directional radiation pattern in a horizontal direction. Furthermore, the main feature is that 2) a ground pattern rather than an antenna pattern itself may be disposed on a rear side of an antenna board, and part of the antenna board may be operated as a transmission line having a ground disposed thereon to implement a low elevation beam pattern. 3) In addition, the main feature is that an antenna radiator operating in 5 GHz and 6 GHz bands is configured to be spaced apart from the ground pattern by a predetermined distance. Accordingly, it may be possible to construct a transmission line having a width of the antenna pattern and a characteristic impedance of 50 ohm.

Meanwhile, the antenna presented herein may be implemented as a vehicle WiFi antenna to provide a WiFi communication service in a vehicle. In relation to the WiFi communication service, the vehicle WiFi antenna may operate in a 5 GHz band and a 6 GHz band in addition to a 2.4 GHz band to provide Wi-Fi 6 and Wi-Fi 7 communication services.

Wi-Fi 6 (IEEE 802.11ax; hereinafter referred to as 802.11ax) is a Wi-Fi standard designed by IEEE with a goal of providing the best Internet quality even in a public Wi-Fi environment through optimizing multiple access environments. Wi-Fi 6 may support speeds of up to 10 Gbps and achieve speeds of 1 Gbps with wider coverage and lower latency. Therefore, Wi-Fi 6 is also called high-efficiency wireless (HEW) by IEEE and the Wi-Fi Alliance. Meanwhile, Wi-Fi 6E, which is an extension standard of Wi-Fi 6, defines communication at 6 GHZ, an unlicensed frequency, as the standard.

Wi-Fi 6 introduces new technologies such as OFDMA, improved MU-MIMO that can be used in both downlink and uplink, spatial frequency reuse, target wake time (TWT), and dynamic fragmentation. Support for up to 256-QAM in 802.11ac has been extended to 1024-QAM. The 802.11ac standard only supports a 5 GHz band, but Wi-Fi 6 may use 2.4 GHz in addition to 5 GHz.

Wi-Fi 7 is a next-generation Wi-Fi standard based on the IEEE 802.11be standard currently being studied by IEEE. Wi-Fi 7 is also called extremely high throughput (EHT). IEEE aims to achieve speeds of up to 30 Gbps in Wi-Fi 7. This is the same goal sought to be implemented in 5G mobile communication.

Wi-Fi 6 introduces technologies focused on maximizing efficiency in a multi-access environment. Meanwhile, Wi-Fi 7 aims to implement low latency (low delay time) and wide transmission speeds to prepare for the era of the 4th industrial revolution, like new radio (NR), which is the 5th generation mobile communication technology.

In order to provide such Wi-Fi 6 and Wi-Fi 7 communication services in a vehicle, an antenna structure having a wideband characteristic and a low elevation beam pattern according to this specification is presented. In this regard, referring to FIG. 6, an antenna module mounted on a vehicle according to this specification may include a PCB 1200, a bottom cover 1310, a top cover 1320, and an antenna PCB 1200*a*. A printed circuit board (PCB) 1200 may be configured to form a transmission line through which a wireless signal is transmitted. The bottom cover 1310 may be configured such that the PCB 1200 is disposed thereon. The top cover 1320 may be fastened to the bottom cover 1310 to accommodate the PCB 1200 therein.

The antenna PCB 1200*a* may be operably coupled to the PCB 1200. A wireless signal transmitted through a transmission line of the PCB 1200 may be transmitted to the antenna PCB 1200*a*.

Referring to FIGS. 6 to 8, the antenna PCB 1200*a* may be formed of a dielectric substrate. A feed line 1120 and an antenna pattern 1110 may be disposed on a first side of the antenna PCB 1200*a*. A ground pattern 1150 may be disposed on a second side of the antenna PCB 1200*a*.

It operates as a radiator in a wide band through the antenna pattern 1110 and the ground pattern 1150. Accordingly, the antenna pattern 1110 and the ground pattern 1150 may be referred to as a radiator or an antenna element 1100.

The ground pattern 1150 may include a plurality of conductive patterns. The ground pattern 1150 may include a first ground pattern 1151 and at least one other ground pattern. As an example, the ground pattern 1150 may include a first ground pattern 1151 and a second ground pattern 1152. As another example, the ground pattern 1150 may include a first ground pattern 1151 and a third ground pattern 1153. As still another example, the ground pattern 1150 may include a first ground pattern 1151, a second ground pattern 1152, and a third ground pattern 1153.

The first ground pattern 1151 may be disposed to have a first width W1 that is larger than a width of the feed line 1120 in a region where the feed line 1120 is disposed. The first ground pattern 1151 may be disposed to have a first width W1 in a first axis direction and a first length L1 in a second axis direction.

The second ground pattern 1152 is disposed to extend from one end portion of the first ground pattern 1151. The second ground pattern 1152 may be disposed to have a second width W2 in the first axis direction and a second length L2 in the second axis direction. In this regard, the first axis direction may be an x-axis direction and the second axis direction may be a y-axis direction. Meanwhile, the first ground pattern 1151 may be disposed in a first region R1 corresponding to a transmission line part. The second ground pattern 1152 may be disposed in a second region R2 corresponding to an antenna part.

The feed line 1120 disposed on the first side, that is, a front side, of the antenna PCB 1200*a* together with the first ground pattern 1151 disposed on the second side, that is, a rear side, of the antenna PCB 1200*a* constitute a transmission line. When ground patterns are disposed on both sides on the same plane as the feed line 1120, the feed line 1120 is configured as a co-planar waveguide (CPW) transmission line. When the ground patterns are not disposed on the same plane as the feed line 1120, the feed line 1120 is configured as a micro-strip transmission line.

The third ground pattern 1153 may extend in a bending manner from one end portion of the second ground pattern 1152. The third ground pattern 1153 may be disposed to have a third width W3 in the second axis direction and a third length L3 in the first axis direction.

The antenna pattern 1110 may be disposed on the first side of the antenna PCB 1200*a*. The antenna pattern 1110 may be configured to be connected to the feed line 1120 disposed on the first side of the antenna PCB 1200*a*. The feed line 1120 may be disposed in the first region R1 corresponding to the transmission line part. The antenna pattern 1110 may be disposed in the second region R2 corresponding to the antenna part.

The antenna pattern 1110 may include a plurality of conductive patterns. The antenna pattern 1110 may include a connection pattern 1111 and one or more extended patterns. The antenna pattern 1110 may include a connection pattern 1111 and a first extended pattern 1112. As another example, the antenna pattern 1110 may include a connection pattern 1111 and a second extended pattern 1113. As still another example, the antenna pattern 1110 may include a connection pattern 1111, a first extended pattern 1112, and a second extended pattern 1113.

The connection pattern 1111 is configured to be connected to the feed line 1120 on the first side, that is, the front side, of the antenna PCB 1200*a*. The first extended pattern 1112 may be configured to extend from a first point of the connection pattern 1111 in one direction on the first axis. The second extended pattern 1113 may be configured to extend from a second point of the connection pattern 1111 in the other direction on the first axis. In this regard, the second point where the second extended pattern 1113 is disposed may be a lower region of the antenna PCB 1200*a* than the first point where the first extended pattern 1112 is disposed, but is not limited thereto.

The feed line 1120 may be disposed to have a first width W1*a* on the first axis and a first length L1*a* on the second axis. The connection pattern 1111 may be disposed to have a second width W2*a* on the second axis and a second length L2*a* on the second axis. In this regard, the second width W2*a* of the connection pattern 1111 may substantially correspond to the second width W2 of the second ground pattern 1152. Here, "substantially corresponding" denotes that the second width W2*a* of the connection pattern 1111 is set to be the same as or different from the second width W2 of the second ground pattern 1152 within a predetermined range. The second width W2*a* of the connection pattern 1111 may substantially correspond to the first width W1*a* of the feed line 1120.

The second length L2*a* of the connection pattern 1111 is disposed to be larger than the second length L2 of the second ground pattern 1152. Accordingly, the antenna pattern 1110 may be converted in a stepwise manner from the transmission line part where the ground pattern is disposed to the antenna part where the ground pattern is not disposed. Therefore, it may be possible to prevent an impedance characteristic of the antenna pattern 1110 from rapidly changing with respect to a region where the ground is disposed and a region where the ground is not disposed.

In this regard, the first ground pattern 1151 in the first region R1 operates as a ground. The second ground pattern 1152 in a first sub-region SR1 of the second region R2 may be considered to operate as a ground and a radiator. The ground pattern is not disposed in the second sub-region SR2 of the second region R2, and accordingly, only the connection pattern 1111 may be considered to operate as a radiator.

It may be configured to operate in a first band, which is a low band in WiFi bands, by the connection pattern 1111 and the first extended pattern 1112. The first band, which is a low band in the WiFi bands, may be a 2.5 GHz band, but is not limited thereto.

The first extended pattern 1112 is disposed to have a first length L1*b* from a first point of the connection pattern 1111 in one direction on the first axis. As an example, the first extended pattern 1112 may extend from an end portion of the connection pattern 1111 in one direction on the first axis to have a first length L1*b*. The first extended pattern 1112 is configured to radiate a wireless signal in the first band. The radiator consisting of the connection pattern 1111 and the first extended pattern 1112 may radiate a wireless signal in the first band.

It may be configured to operate in a second band, which is a high band in the WiFi bands, by the connection pattern 1111 and the second extended pattern 1113. The second band, which is a high band in the WiFi bands, may be a 5 to 7 GHz band, but is not limited thereto.

The second extended pattern 1113 is disposed to have a second length L1*b* from a second point of the connection pattern 1111 in the other direction on the first axis. As an example, the second extended pattern 1113 may extend from a second point on the other side of the connection pattern 1111 in the other direction on the first axis to have a second length L1*b*. The second extended pattern 1113 is configured to radiate a wireless signal in a second band higher than the first band. The radiator consisting of the connection pattern 1111 and the second extended pattern 1113 may radiate a wireless signal in the second band.

As shown in FIG. 8, the radiator is configured to resonate in the first band by a low band branch consisting of the connection pattern 1111 and the first extended pattern 1112. The radiator is configured to resonate in the second band by a high band branch consisting of the connection pattern 1111 and the second extended pattern 1113. In this regard, a first current I1 is formed along the connection pattern 1111 and the first extended pattern 1112 disposed on the first side of the antenna PCB 1200*a*. The first radiator is configured by the first current I1 formed along the connection pattern 1111 and the first extended pattern 1112 disposed on the first side of the antenna PCB 1200*a*. The first radiator consisting of a first configuration of the connection pattern 1111 and the first extended pattern 1112 resonates in the second band.

Meanwhile, a second current I2 is formed along the second ground pattern 1152 and the third ground pattern 1153 disposed on the second side of the antenna PCB 1200*a*.

The second current I2 is formed along the second ground pattern 1112 and the third ground pattern 1113 and is therefore referred to as an image current. The direction of the first current I1 formed along the connection pattern 1111 and the direction of the second current I2 formed along the second ground pattern 1152 are formed in opposite directions. On the contrary, the direction of the first current I1 formed along the first extended pattern 1112 and the second current I2 formed along the third ground pattern 1153 are identical. Accordingly, the second radiator is configured by an equivalent current (Ie) formed on the first extended pattern 1112 and the third ground pattern 1153.

The second radiator resonates in the second band by the equivalent current (Ie) formed along the first extended pattern 1112 disposed on the first side of the antenna PCB 1200*a* and the third ground pattern 1153 disposed on the second side thereof. A second radiator consisting of a second configuration of the first extended pattern 1112 and the third ground pattern 1153 resonates in the second band. Therefore, by combining the first radiator in the first configuration and the second radiator in the second configuration, the antenna pattern 1110 may operate in a wide range in an entire frequency band of the second band, that is, a 5 to 7 GHz band.

Conductive patterns on the first and second sides of the antenna PCB 1200*a* may be disposed to correspond to each other. A point where the third ground pattern 1153 is bent may be set as a point corresponding to the second point where the second extended pattern 1113 is disposed. The second extended pattern 1113 is disposed to have a first length L1*b* in one direction on the first side of the antenna PCB 1200*a*. The antenna PCB 1200*a* is disposed to have a third length L3 on the second side of the antenna PCB 1200*a* in the other direction.

Meanwhile, conductive patterns on the first and second sides of the antenna PCB 1200*a* may be configured to be combined at at least one point. In this regard, the conductive patterns on the first and second sides of the antenna PCB 1200*a* may be interconnected at corresponding points by a vertical connection structure, for example, a via connection structure. In this regard, the antenna pattern 1110 disposed on the first side of the antenna PCB 1200*a* and the ground pattern 1150 disposed on the second side of the antenna PCB 1200*a* may be interconnected by a vertical connection structure 1160, such as a via hole 1160.

In this regard, the second extended pattern 1113 and the third ground pattern 1153 may be vertically connected at one point by a vertical connection structure 1160, for example, a via hole 1160. Accordingly, at one point in a region where the antenna pattern 1110 and the ground pattern 1150 overlap, the second extended pattern 1113 and the third ground pattern 1153 may be connected vertically by the via hole 1160. Accordingly, a current level formed on the second extended pattern 1113 and a current level formed on the third ground pattern 1153 in the third band may be the same or similar to each other. Therefore, the antenna element 1100 operates as a radiator in the third band in addition to the second band.

Meanwhile, an entire frequency band of the 5 to 7 GHz band may be considered to include the second band and the third band. As described above, the direction of the first current I1 formed in the second extended pattern 1113 and the direction of the second current I2 formed in the third ground pattern 1153 may be formed in the same direction. The second extended pattern 1113 and the third ground pattern 1153 may be configured to operate in the third band different from the second band due to the first current I1 and the second current I2. Accordingly, by combining the first radiator in the first configuration and the second radiator in the second configuration, the antenna pattern 1110 may operate in a wide band in an entire frequency band of the 5 to 7 GHz band including the second band and the third band.

Figure 9:
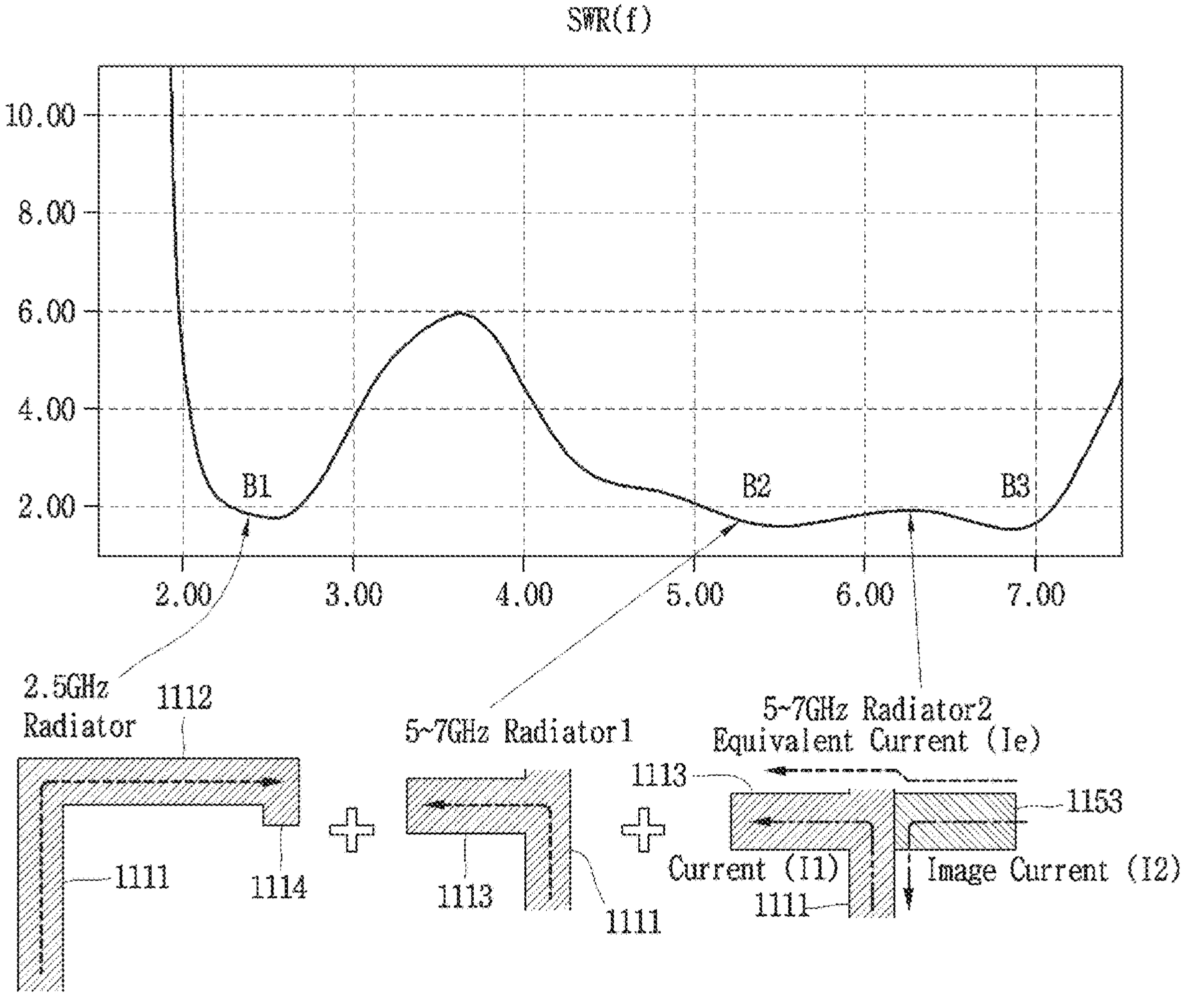
FIG. 9 shows a reflection coefficient characteristic of the wideband antenna element presented herein and antenna configurations operating in first to third bands.

As described above, a wideband antenna element presented herein is configured to resonate in an entire band including the first to third bands. In this regard, FIG. 9 shows a reflection coefficient characteristic of the wideband antenna element presented herein and antenna configurations operating in first to third bands. Meanwhile, FIGS. 10A to 10C show electric field distributions and surface current distributions in antenna configurations operating in first to third bands, respectively.

Referring to FIGS. 7 to 9, a radiator consisting of a connection pattern 1111 and a first extended pattern 1112 corresponding to a low-band branch resonates in a first band B1. A first radiator consisting of a connection pattern 1111 and a second extended pattern 1113 corresponding to a high-band branch resonates in a second band B2. Meanwhile, a second radiator consisting of a third ground pattern 1153 and a second extended pattern 1113 corresponding to a branch extending from the ground resonates in a third band B3.

Figure 10A:
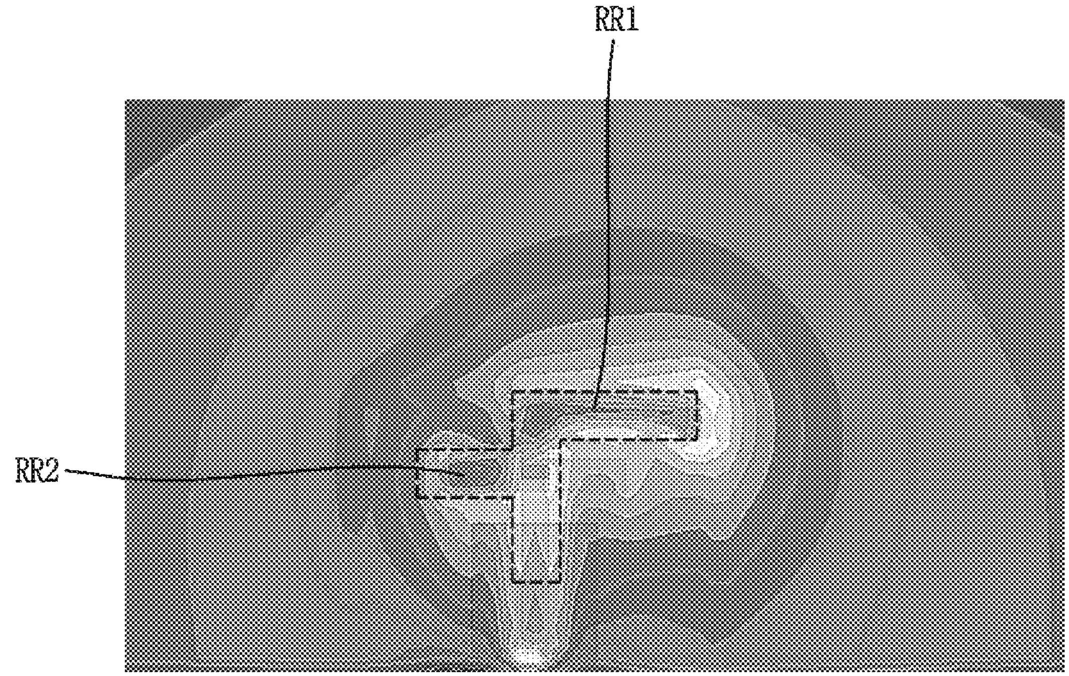
FIGS. 10A to 10C show electric field distributions and surface current distributions in antenna configurations operating in first to third bands, respectively.
Figure 10A:
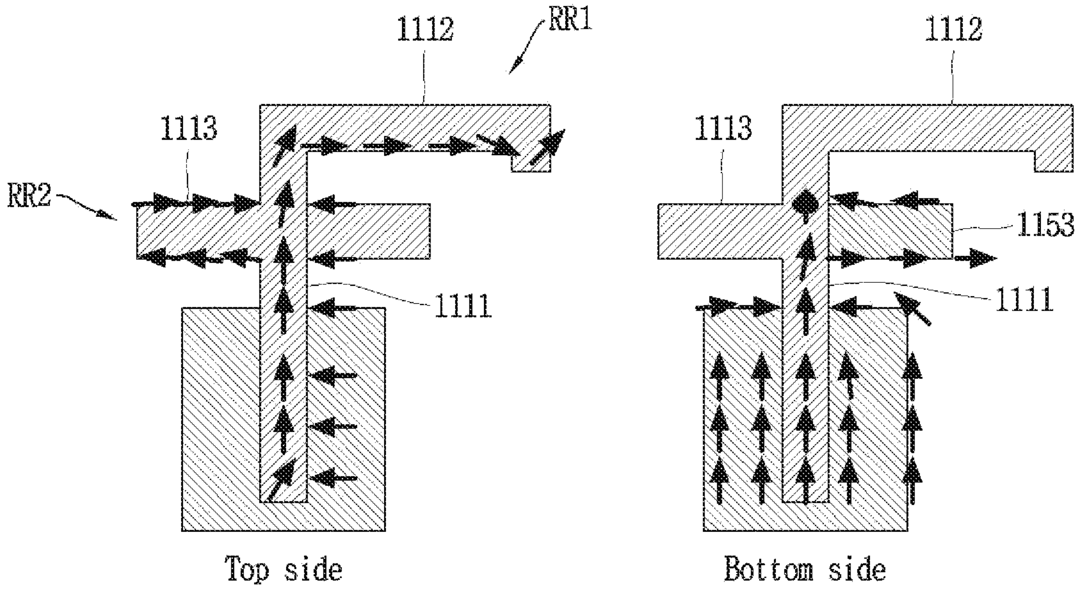
Figure 10B:
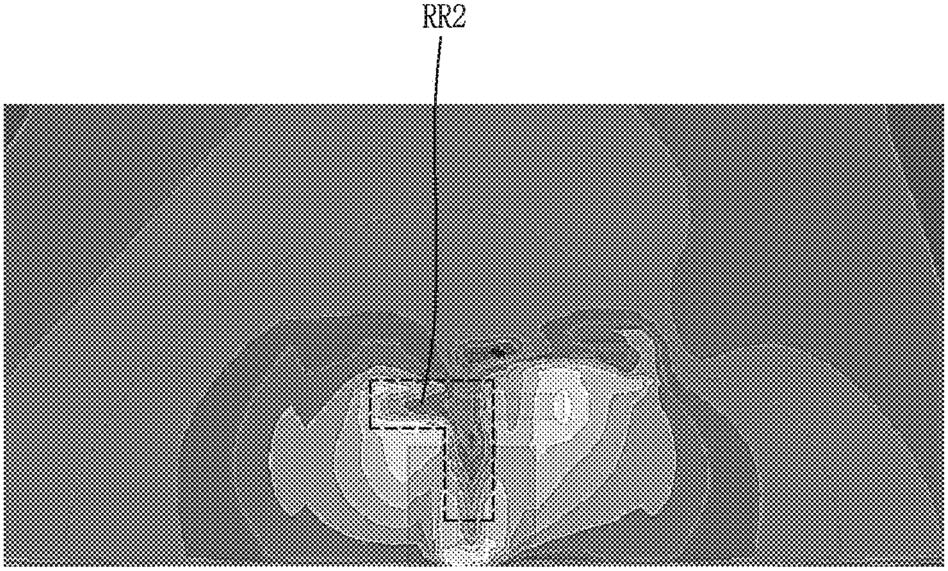
Figure 10B:
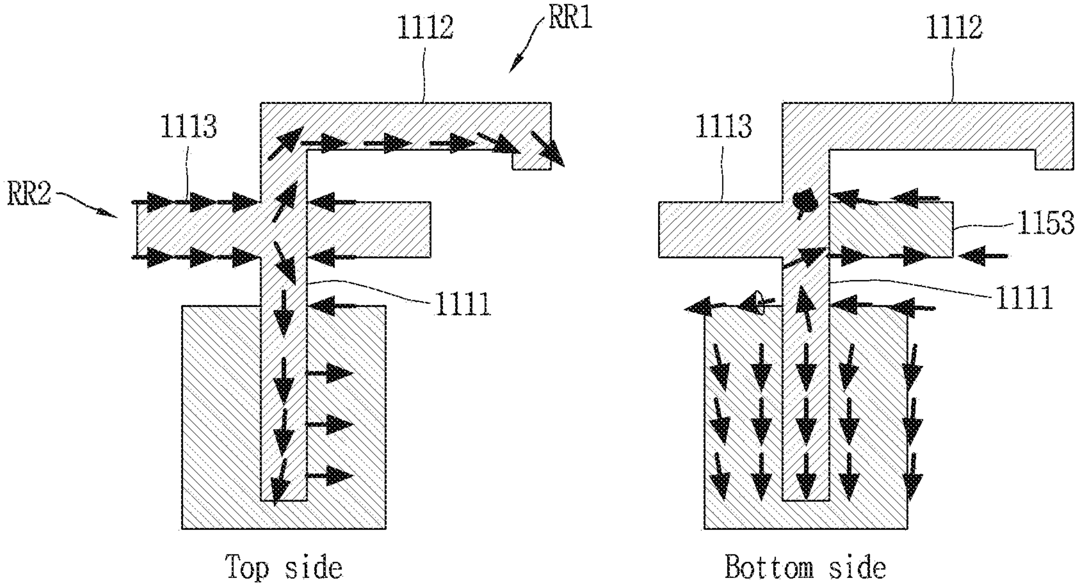
Figure 10C:
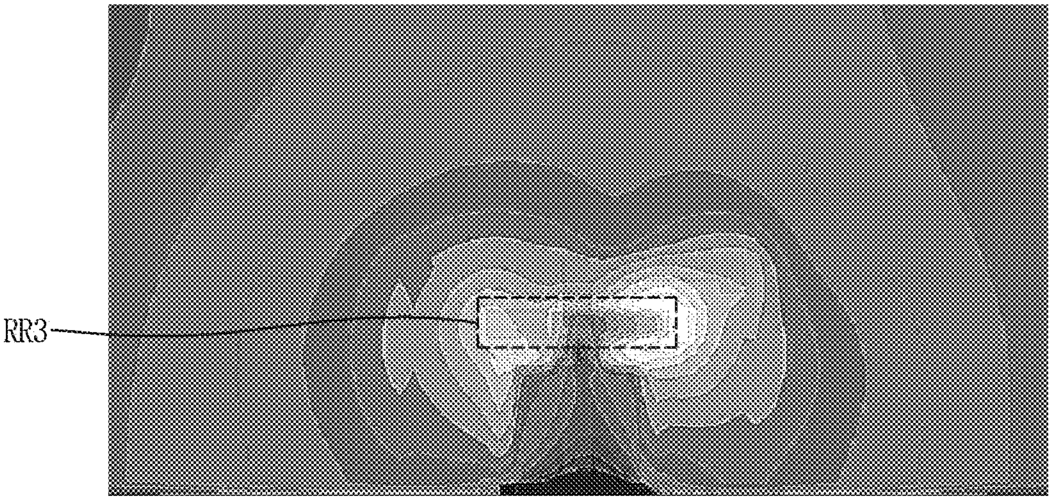
Figure 10C:
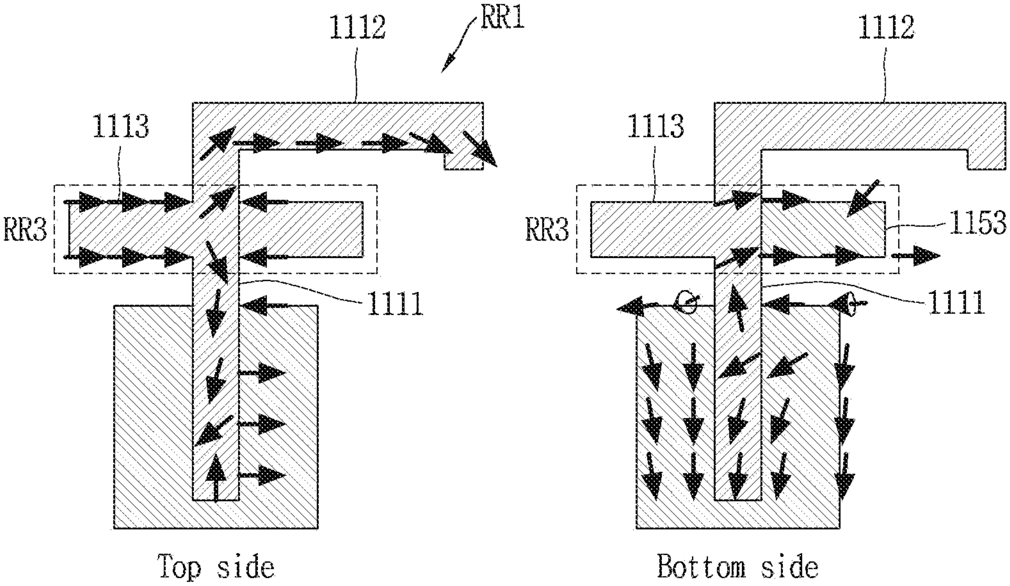

FIG. 10A shows an electric field distribution and a surface current distribution at a frequency in a first band, for example, 2.4 GHz. FIG. 10B shows an electric field distribution and a surface current distribution at a frequency in a second band, for example, 5.4 GHz. FIG. 10C shows an electric field distribution and a surface current distribution at a frequency in a third band, for example, 6.4 GHz.

Referring to FIGS. 7 to 9 and (a) of FIG. 10A, an electric field intensity in a first radiation region RR1 of the connection pattern 1111 and the first extended pattern 1112 is formed to be higher than that of the surrounding region. Meanwhile, an electric field intensity in a second radiation region RR2 of the second extended pattern 1113 is also formed to be higher than that of the surrounding region.

Referring to FIGS. 7 to 9 and (b) of FIG. 10A, a current distribution on a first side of the antenna PCB 1200*a* is mainly distributed in the first radiation region RR1 of the connection pattern 1111 and the first extended pattern 1112. In this regard, a current distribution in the second extended pattern 1113 of the second radiation region RR2 is formed in opposite directions on both sides. Therefore, the second extended pattern 1113 does not contribute to the radiation of a signal in the first band. A current distribution on a second side of the antenna PCB 1200*a* is formed along the first to third ground patterns 1151 to 1153. Therefore, the first to third ground patterns 1151 to 1153 operate normally as ground regions for the connection pattern 1111 and the first extended pattern 1112.

Referring to FIGS. 7 to 9 and (a) of FIG. 10B, an electric field intensity in a second radiation region RR2 of the connection pattern 1111 and the second extended pattern 1113 is formed to be higher than that of the surrounding region.

Referring to FIGS. 7 to 9 and (b) of FIG. 10B, a current distribution on a first side of the antenna PCB 1200*a* is mainly distributed in the second radiation region RR2 of the connection pattern 1111 and the second extended pattern 1113. In this regard, a current distribution in the second extended pattern 1113 of the second radiation region RR2 is formed in the same direction on both sides. Therefore, the second extended pattern 1113 contributes to the radiation of a signal in the second band. A current distribution on a second side of the antenna PCB 1200*a* is formed along the first to third ground patterns 1151 to 1153. Therefore, the first to third ground patterns 1151 to 1153 operate normally as ground regions for the connection pattern 1111 and the first extended pattern 1112.

Referring to FIGS. 7 to 9 and (a) of FIG. 10C, an electric field intensity in a third radiation region RR3 of the third ground pattern 1153 and the second extended pattern 1113 is formed to be higher than that of the surrounding region.

Referring to FIGS. 7 to 9 and (b) of FIG. 10C, a current distribution on a first side of the antenna PCB 1200*a* is mainly distributed in the third radiation region RR3 of the third ground pattern 1153 and the second extended pattern 1113. In this regard, a current distribution in the second extended pattern 1113 of the third radiation region RR3 is formed in the same direction on both sides. Therefore, the second extended pattern 1113 contributes to the radiation of a signal in the second band. Additionally, a current distribution in the third ground pattern 1153 of the third radiation region RR3 is formed in the same direction on both sides. Therefore, the third ground pattern 1153 contributes to the radiation of a signal in the third band.

Referring to FIGS. 7 to 9, the antenna pattern 1110 may include a connection pattern 1111, a first extended pattern 1112, a second extended pattern 1113, and a fourth extended pattern 1114. The fourth extended pattern 1114 may extend in a bending manner from an end portion of the second extended pattern 1112. The fourth extended pattern 1114 may be configured to adjust a resonance frequency in a radiator consisting of the connection pattern 1111 and the second extended pattern 1112. The fourth extended pattern 1114 may be formed to have a predetermined length on the second axis.

Meanwhile, a wideband antenna structure presented herein may be disposed to be electrically connected to a main PCB 1200. In this regard, FIG. 11 shows a connection structure of the antenna element according to this specification.

Figure 11:
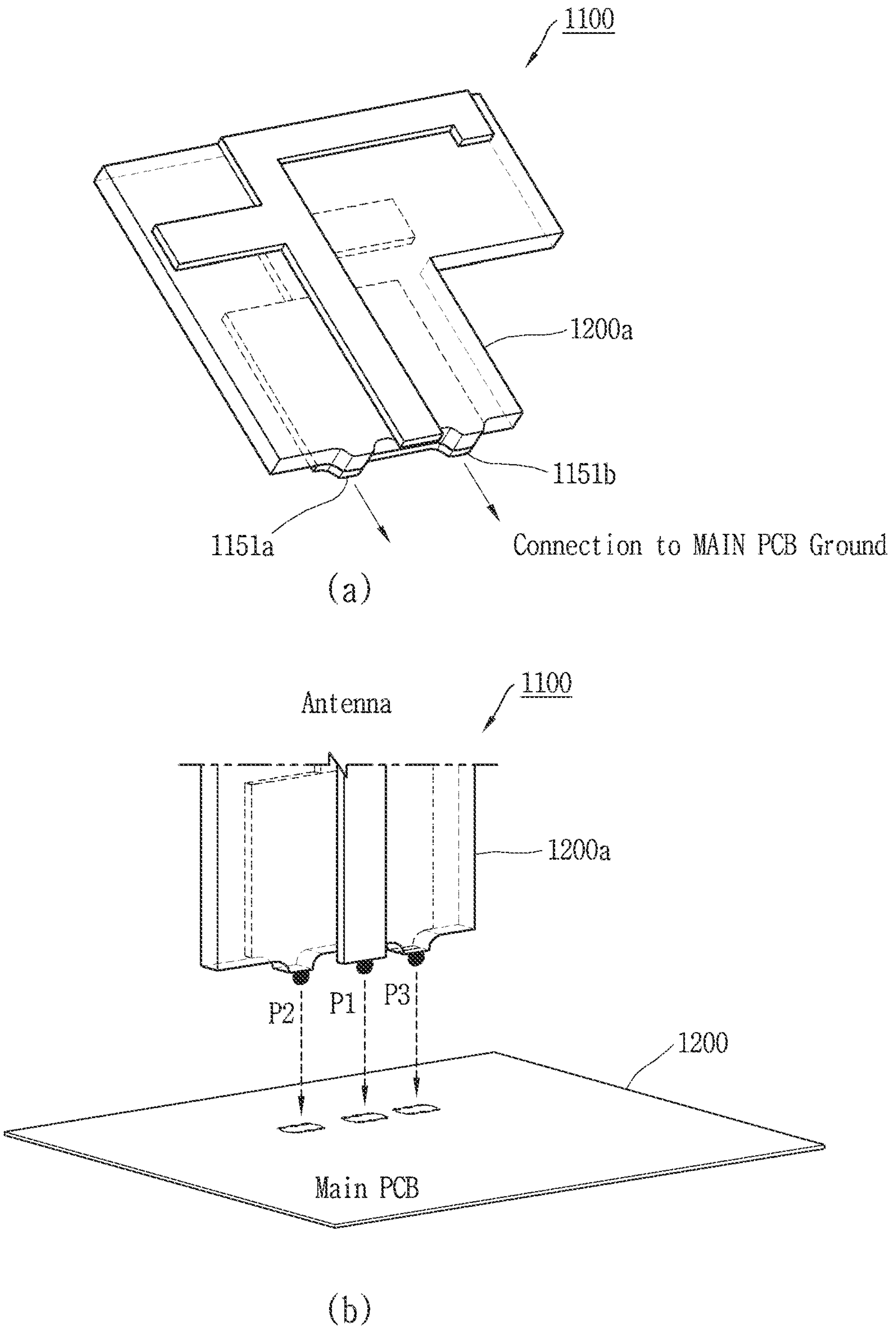
FIG. 11 shows a connection structure of the antenna element according to this specification.

Referring to FIGS. 7 to 9 and (a) of FIG. 11, the antenna PCB 1200*a* may be configured to be connected to a transmission line on the PCB. To this end, the feed line 1120 disposed on the first side of the antenna PCB 1200*a* may be configured to be electrically connected to a signal line of the PCB. Additionally, the first ground pattern 1151 disposed on the second side of the antenna PCB 1200*a* may be configured to be electrically connected to a ground pattern of the PCB.

In this regard, referring to FIGS. 7 to 9 and (b) of FIG. 11, the feed line 1120 disposed on the first side of the antenna PCB 1200*a* is connected to a signal line of the PCB 1200. Meanwhile, the first ground pattern 1151 disposed on the second side of the antenna PCB 1200*a* is connected to a signal ground pattern of the PCB 1200. In this regard, the PCB 1200 may form a CPW transmission line in which ground patterns are disposed to be spaced apart by a predetermined gap on both sides of the signal line.

The first ground pattern 1151 may include ground connection parts 1151*a*, 1151*b* disposed from an end portion of the antenna PCB 1200*a* to a side region thereof to be connected to a ground pattern of the PCB 1200. The ground pattern of the antenna PCB 1200*a* may be connected to the ground pattern of the PCB 1200 at a second point P2 and a third point P3 through the ground connection parts 1151*a*, 1151*b*. Meanwhile, the feed line 1120 disposed on the first side of the antenna PCB 1200*a* at a first point P1 between the second point P2 and the third point P3 may be connected to a signal line of the PCB 1200.

The vertical connection structure will be described with reference to FIGS. 5 to 11. The antenna PCB 1200*a* is disposed perpendicular to the PCB 1200 disposed in parallel to the bottom cover 1310. The antenna module 1000 may radiate an antenna beam tilted by a predetermined angle with respect to a bottom surface of the bottom cover 1310 by the antenna PCB 1200*a* in front and rear directions of the antenna PCB 1210*a* as shown in (b) of FIG. 5.

In this regard, the antenna PCB 1200*a* may implement a low elevation beam pattern by first and second beams radiating in the front and rear directions. A first beam is formed at an angle spaced apart by a predetermined angle with respect to the PCB 1200 by the connection pattern 1111, the first extended pattern 1112, and the second extended pattern 1113 disposed on the first side of the antenna PCB 1200*a*. Meanwhile, a second beam is formed at an angle spaced apart by a predetermined angle with respect to the PCB 1200 by the ground pattern 1150 disposed on the second side of the antenna PCB 1200*a*. Therefore, the antenna beam tilted by a predetermined angle with respect to the bottom surface of the bottom cover 1310 by the first beam and the second beam may be radiated in the front and rear directions of the antenna PCB 1210*a*.

Figure 12:
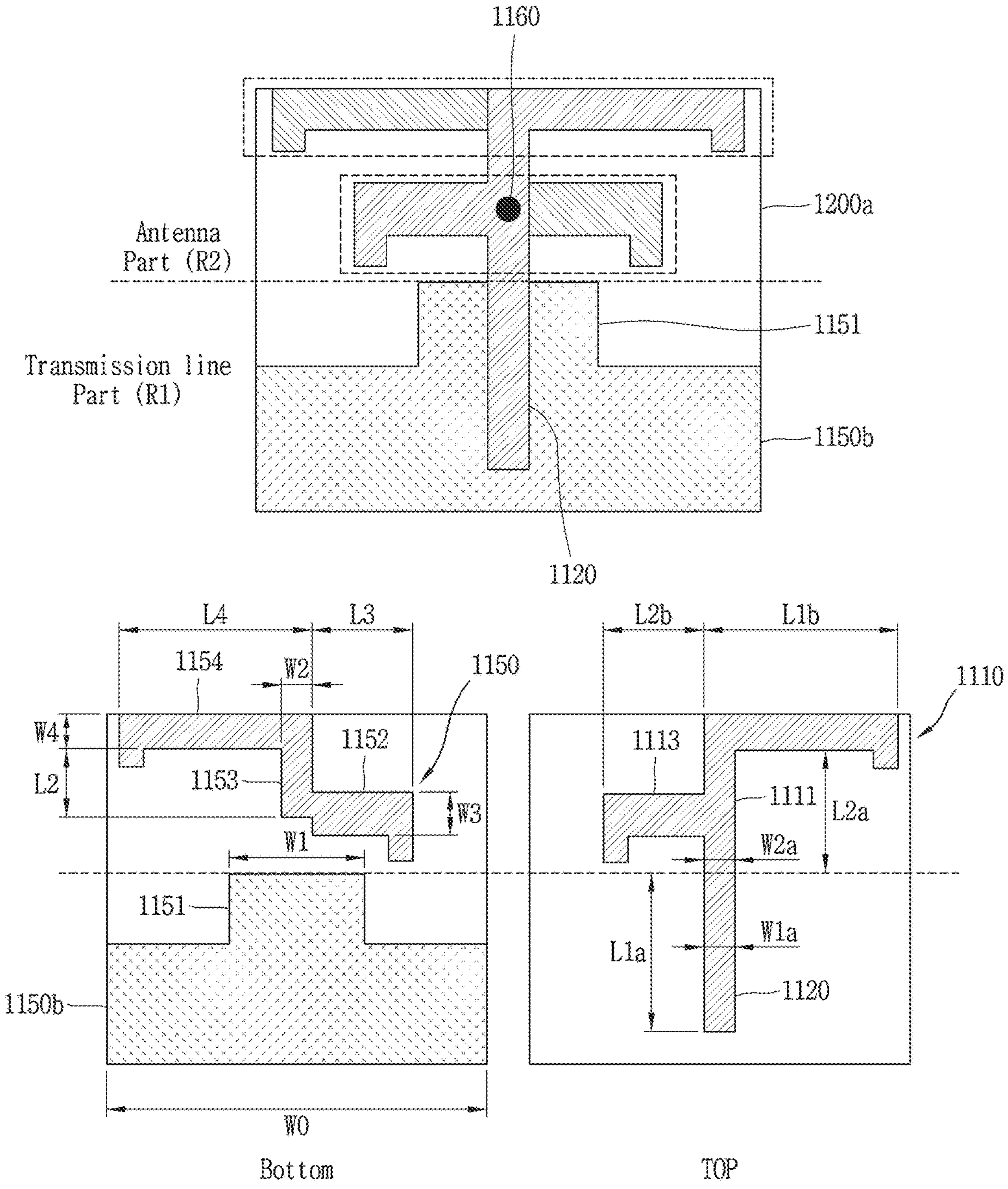
FIG. 12 shows a view showing a wideband antenna element according to this specification disposed on first and second sides of an antenna PCB, a front view disposed on the first side, and a rear view disposed on the second side.
Figure 13:
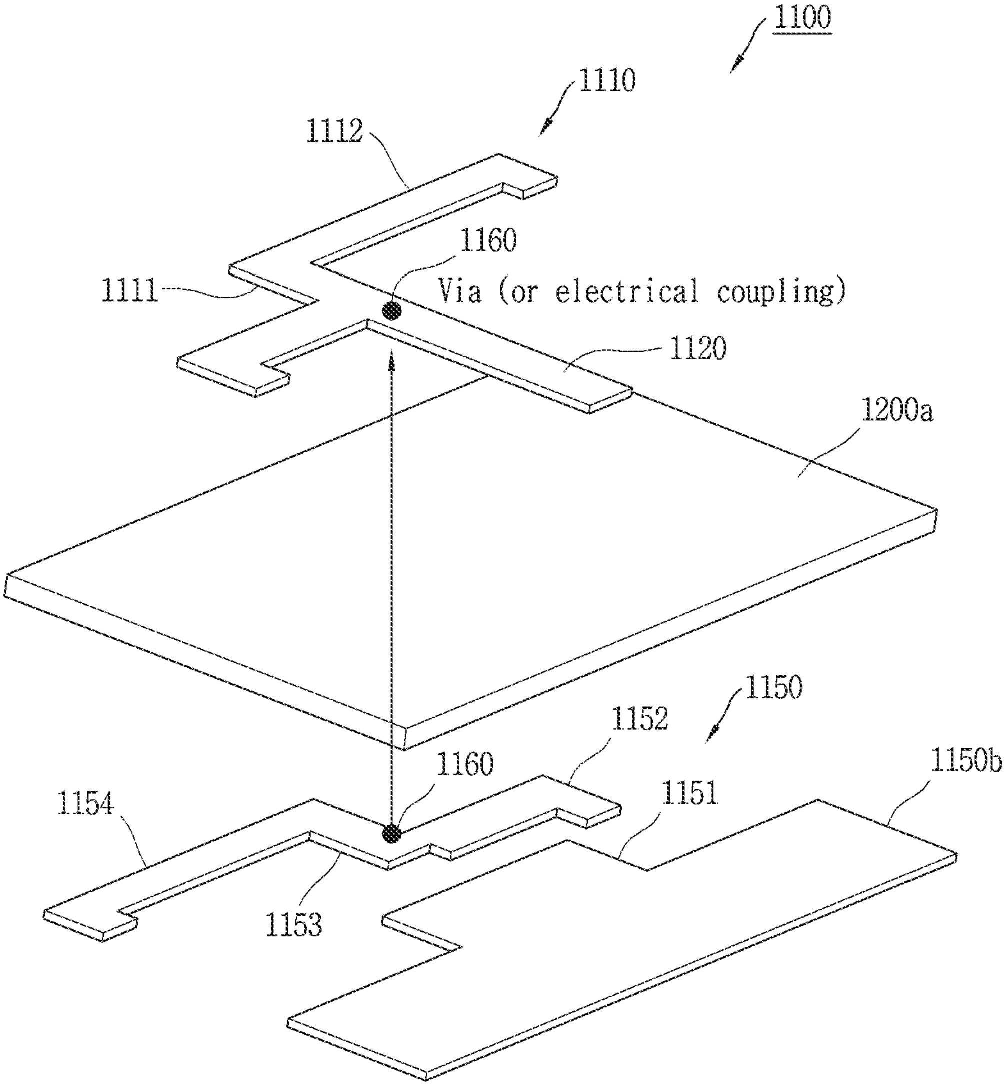
FIG. 13 shows an exploded view of the wideband antenna element of FIG. 12.

A mirror structure of the antenna pattern and the ground pattern in the wideband antenna presented herein may also be implemented at an end portion of the connection pattern in addition to at one point of the connection pattern of the antenna pattern. In addition, part of the ground pattern in the wideband antenna presented herein may not be connected thereto but spaced apart therefrom so as to be coupled to a wireless signal. In this regard, FIG. 12 shows a view showing a wideband antenna element according to this specification disposed on first and second sides of an antenna PCB, a front view disposed on the first side, and a rear view disposed on the second side. FIG. 13 shows an exploded view of the wideband antenna element of FIG. 12.

In an antenna structure shown in FIGS. 12 and 13, both a first radiator as an upper radiator and a second radiator as a lower radiator are disposed in a mirror structure in the second region R2 corresponding to the antenna part. That is, an antenna pattern disposed on the first side of the antenna substrate 1200*a* and a ground pattern disposed on the second side are disposed in a left-right symmetrical structure.

Referring to FIGS. 6, 12, and 13, an antenna module mounted on a vehicle according to this specification may include a PCB 1200, a bottom cover 1310, a top cover 1320, and an antenna PCB 1200*a*. The PCB 1200 may be configured to form a transmission line through which a wireless signal is transmitted. The bottom cover 1310 may be configured such that the PCB 1200 is disposed thereon. The top cover 1320 may be fastened to the bottom cover 1310 to accommodate the PCB 1200 therein.

The antenna PCB 1200*a* may be operably coupled to the PCB 1200. A wireless signal transmitted through a transmission line of the PCB 1200 may be transmitted to the antenna PCB 1200*a*.

A feed line 1120 and an antenna pattern 1110 may be disposed on the first side of the antenna PCB 1200*a*. A ground pattern 1150 may be disposed on the second side of the antenna PCB 1200*a*. It operates as a radiator in a wide band through the antenna pattern 1110 and the ground pattern 1150. Accordingly, the antenna pattern 1110 and the ground pattern 1150 may be referred to as a radiator or an antenna element 1100.

The ground pattern 1150 may include a plurality of conductive patterns. The ground pattern 1150 may include a first ground pattern 1151 and at least one other ground pattern. As an example, the ground pattern 1150 may include a first ground pattern 1151 and a second ground pattern 1152. As another example, the ground pattern 1150 may include a first ground pattern 1151 and a fourth ground pattern 1154. As still another example, the ground pattern 1150 may include a first ground pattern 1151, a second ground pattern 1152, and a fourth ground pattern 1154. As still another example, the ground pattern 1150 may include a first ground pattern 1151, a second ground pattern 1152, a third ground pattern 1153, and a fourth ground pattern 1154.

An end portion of the second ground pattern 1152 may be configured in a bending manner to adjust a resonance characteristic of the first band. A bent portion at an end portion of the second ground pattern 1152 may be referred to as a separate ground pattern. An end portion of the fourth ground pattern 1154 may be configured in a bending manner to adjust a resonance characteristic of the second band and/or the third band. A bent portion at the end portion of the fourth ground pattern 1154 may be referred to as a separate ground pattern.

Meanwhile, the antenna pattern 1110 and the ground pattern 1150 may be connected to each other through a vertical connection structure 1160 such as a via hole 1160. The second to fourth ground patterns 1152 to 1154 disposed on the second side of the antenna PCB 1200*a* are connected to the antenna pattern 1110 disposed on the first side. Meanwhile, the second to fourth ground patterns 1152 to 1154 disposed on the second side of the antenna PCB 1200*a* are configured not to be connected to the first ground pattern 1151. Therefore, the second ground patterns 1152 to fourth ground patterns 1154 may be connected and coupled to the antenna pattern 1110, and thus may be referred to as second coupling patterns 1152 to fourth coupling patterns 1154.

The first ground pattern 1151 is disposed to have a first width W1 that is larger than a width of the feed line 1120 in a region where the feed line 1120 is disposed. In this regard, the first ground pattern 1151 may be connected to the ground pattern 1150*b* having a width W0 that is larger than the first width W1.

The second ground pattern 1152 is disposed to be spaced apart from one end portion of the first ground pattern 1151. The second ground pattern 1152 is disposed to have a predetermined length in a first axis direction parallel to the first ground pattern 1151. The third ground pattern 1153 extends in a bending manner from one end portion of the second ground pattern 1152 and is disposed perpendicular to the second ground pattern 1152. The fourth ground pattern 1154 extends in a bending manner from one end portion of the third ground pattern 1153 and is disposed perpendicular to the third ground pattern 1153.

The antenna pattern 1110 may be disposed on the first side of the antenna PCB 1200*a*. The antenna pattern 1110 may be configured to be connected to the feed line 1120 disposed on the first side of the antenna PCB 1200*a*. The feed line 1120 may be disposed in the first region R1 corresponding to the transmission line part. The antenna pattern 1110 may be disposed in the second region R2 corresponding to the antenna part.

The antenna pattern 1110 may include a plurality of conductive patterns. The antenna pattern 1110 may include a connection pattern 1111 and one or more extended patterns. The antenna pattern 1110 may include a connection pattern 1111 and a first extended pattern 1112. As another example, the antenna pattern 1110 may include a connection pattern 1111 and a second extended pattern 1113. As still another example, the antenna pattern 1110 may include a connection pattern 1111, a first extended pattern 1112, and a second extended pattern 1113.

The connection pattern 1111 is configured to be connected to the feed line 1120 on the first side, that is, the front side, of the antenna PCB 1200*a*. The first extended pattern 1112 may be configured to extend from a first point of the connection pattern 1111 in one direction on the first axis. The second extended pattern 1113 may be configured to extend from a second point of the connection pattern 1111 in the other direction on the first axis. In this regard, the second point where the second extended pattern 1113 is disposed may be a lower region of the antenna PCB 1200*a* than the first point where the first extended pattern 1112 is disposed, but is not limited thereto.

The feed line 1120 may be disposed to have a first width W1*a* on the first axis and a first length L1*a* on the second axis. The connection pattern 1111 may be disposed to have a second width W2*a* on the second axis and a second length L2*a* on the second axis. In this regard, the second width W2*a* of the connection pattern 1111 may substantially correspond to the second width W2 of the second ground pattern 1152. Here, "substantially corresponding" denotes that the second width W2*a* of the connection pattern 1111 is set to be the same as or different from the second width W2 of the second ground pattern 1152 within a predetermined range. The second width W2*a* of the connection pattern 1111 may substantially correspond to the first width W1*a* of the feed line 1120.

The second length L2*a* of the connection pattern 1111 is disposed to be larger than the second length L2 of the second ground pattern 1152. Accordingly, the antenna pattern 1110 may be converted in a stepwise manner from the transmission line part where the ground pattern is disposed to the antenna part where the ground pattern is not disposed. Therefore, it may be possible to prevent an impedance characteristic of the antenna pattern 1110 from rapidly changing with respect to a region where the ground is disposed and a region where the ground is not disposed.

It may be configured to operate in a first band, which is a low band in WiFi bands, by the connection pattern 1111 and the first extended pattern 1112. The first band, which is a low band in the WiFi bands, may be a 2.5 GHz band, but is not limited thereto.

The first extended pattern 1112 is disposed to have a first length L1*b* from a first point of the connection pattern 1111 in one direction on the first axis. As an example, the first extended pattern 1112 may extend from an end portion of the connection pattern 1111 in one direction on the first axis to have a first length L1*b*. The first extended pattern 1112 is configured to radiate a wireless signal in the first band. The radiator consisting of the connection pattern 1111 and the first extended pattern 1112 may radiate a wireless signal in the first band.

It may be configured to operate in a second band, which is a high band in the WiFi bands, by the connection pattern 1111 and the second extended pattern 1113. The second band, which is a high band in the WiFi bands, may be a 5 to 7 GHz band, but is not limited thereto.

The second extended pattern 1113 is disposed to have a second length L2*b* from a second point of the connection pattern 1111 in the other direction on the first axis. As an example, the second extended pattern 1113 may extend from a second point on the other side of the connection pattern 1111 in the other direction on the first axis to have a second length L2*b*. The second extended pattern 1113 is configured to radiate a wireless signal in a second band higher than the first band. The radiator consisting of the connection pattern 1111 and the second extended pattern 1113 may radiate a wireless signal in the second band.

The first extended pattern 1112 bent to one side at an end portion of the antenna pattern 1110 may also be configured in a mirror shape with respect to the ground pattern. Accordingly, a bandwidth in the first band, which is a low band, may also be extended. To this end, the first extended pattern 1112 and the fourth ground pattern 1154 are disposed at points corresponding thereto. In this regard, the fourth ground pattern 1154 is bent to extend from the third ground pattern 1153 at a point corresponding to a first point where the first extended pattern 1112 is disposed. The fourth ground pattern 1154 is disposed in the other direction on the first axis. Therefore, the first extended pattern 1112 is disposed to have a first length L1*b* in one direction on the first side of the antenna PCB 1200. The fourth ground pattern 1154 is disposed to have a fourth length L4 in the other direction on the second side of the antenna PCB 1200.

Meanwhile, at one point of the connection pattern 1111 of the antenna pattern 1100, the second ground pattern 1152 and the third extended pattern 1113 may be formed at a point corresponding thereto. In this regard, a point where the second ground pattern 1152 is disposed corresponds to a second point where the third extended pattern 1113 is disposed. Therefore, the third extended pattern 1113 is disposed to have a second length L2*b* in the other direction on the first side of the antenna PCB 1200. The second ground pattern 1152 is disposed to have a third length L3 in one direction on the second example of the antenna PCB 1200.

As described in an embodiment of FIGS. 7 to 9, the second ground pattern 1152 and the second extended pattern 1113 also operate as a first radiator and a second radiator in an embodiment of FIGS. 12 and 13. Therefore, they may operate in the second and third bands in the WiFi bands. An antenna operation in the third band in the WiFi bands is due to the first current I1 and the second current I2 formed in the same direction along the second ground pattern 1152 and the second extended pattern 1113. In this regard, the direction of the first current formed in the second extended pattern 1113 and the direction of the second current I2 formed in the second ground pattern 1152 are formed in the same direction. The second extended pattern 1113 and the second ground pattern 1152 are configured to operate as a second radiator in a third band higher than the second band due to the first current I1 and the second current I2.

Figure 14A:
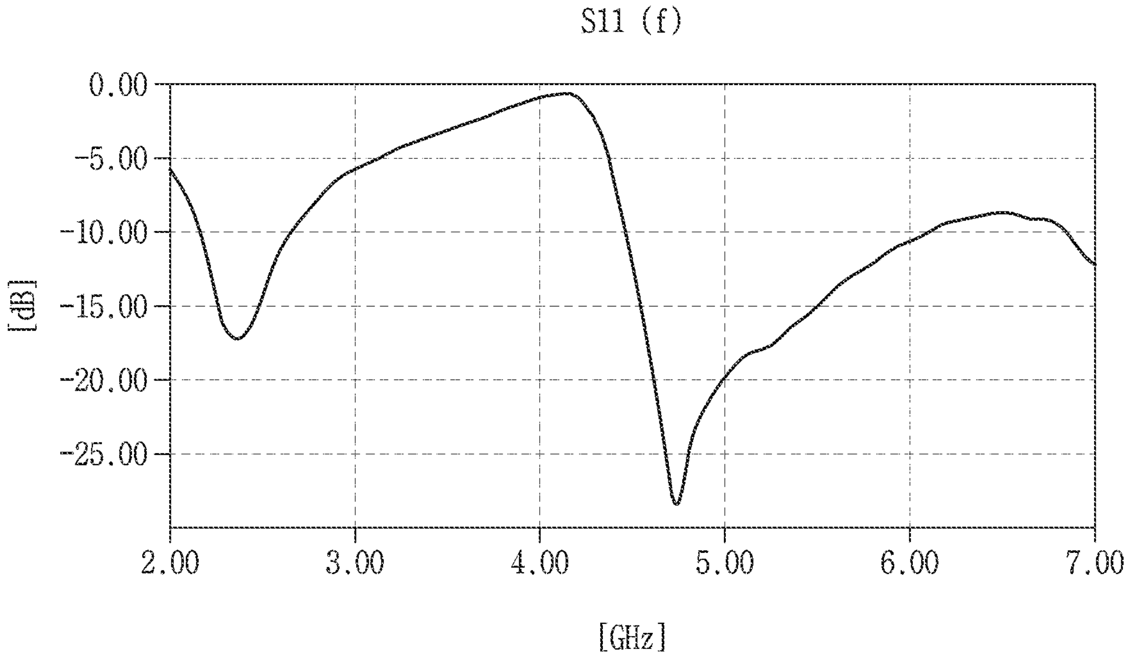
FIG. 14A shows a reflection coefficient characteristic of the antenna element of FIGS. 12 and 13.
Figure 14B:
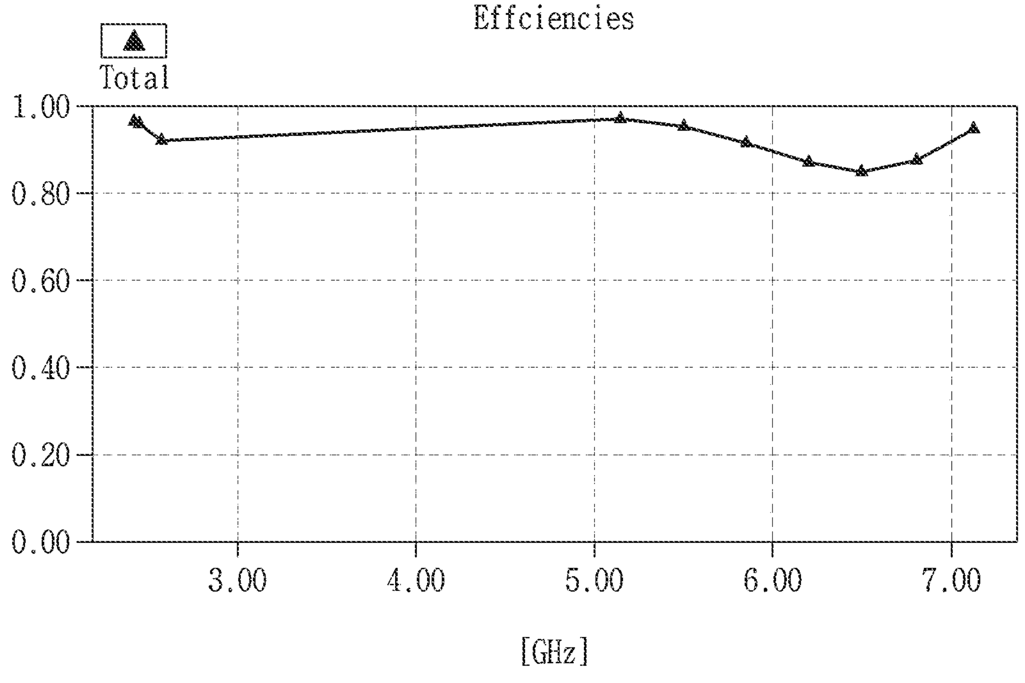
FIG. 14B shows an efficiency characteristic of the antenna element of FIGS. 12 and 13.

The antenna characteristics of a wideband antenna element according to an embodiment of FIGS. 12 and 13 will be described. In this regard, FIG. 14A shows a reflection coefficient characteristic of the antenna element of FIGS. 12 and 13. FIG. 14B shows an efficiency characteristic of the antenna element of FIGS. 12 and 13.

Referring to FIGS. 12, 13, and 14A, the antenna element shows a double resonance characteristic of resonating not only in a first band, for example, in a 2.4 GHz band, but also in a second band, for example, in an about 5.4 GHz band. Additionally, the antenna element has a characteristic of resonating in a third band, for example, in a 6.4 GHz band, in addition to the first and second bands. In this regard, similar to the antenna element of FIGS. 7 to 9, the antenna element operates in the first band by the connection pattern 1111 and the first extended pattern 1112. The antenna element operates in the second band by the connection pattern 1111 and the second extended pattern 1113. Additionally, the antenna element operates in the third band by the second ground pattern 1152 and the second extended pattern 1113.

Referring to FIGS. 12, 13, and 14B, the antenna element shows a very high antenna efficiency of 80% or more not only in the first band, for example, in the 2.4 GHz band, but also in the second band, for example, in the about 5.4 GHz band. In addition to the first and second bands, the antenna element shows a very high antenna efficiency of over 80% even in the third band, for example, the 6.4 GHz band.

Figure 15:
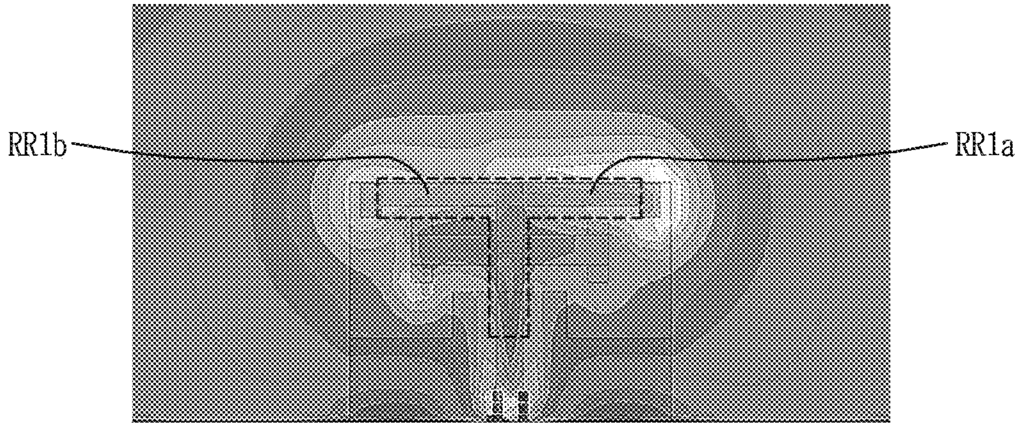
FIG. 15 shows electric field distributions formed on the antenna pattern and ground pattern of FIGS. 12 and 13.
Figure 15:
Figure 15:
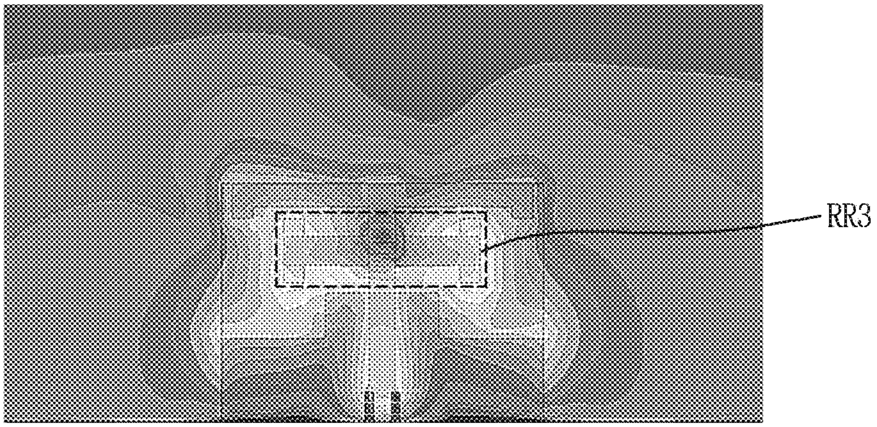
Figure 16:
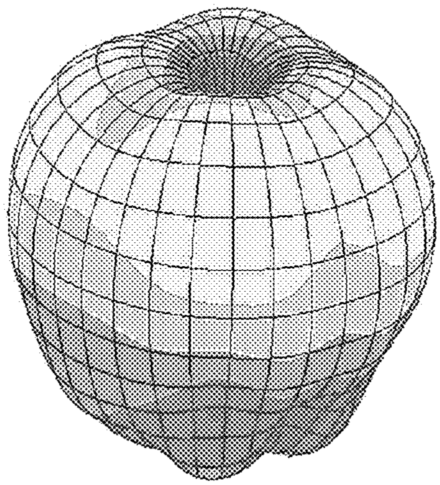
FIG. 16 shows 3D radiation patterns formed by an antenna structure of FIGS. 12 and 13.
Figure 16:
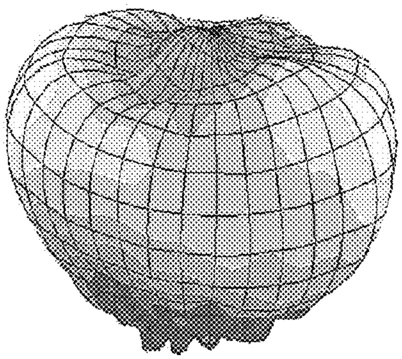
Figure 16:
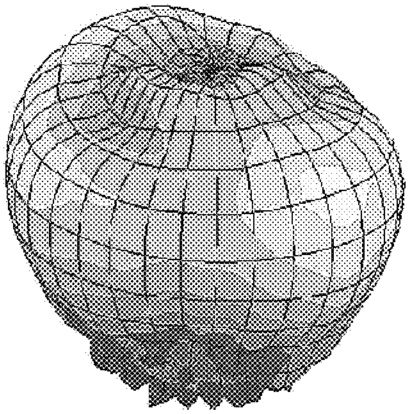

The electric field distribution and 3D radiation pattern of the wideband antenna element of FIGS. 12 and 13 have similar characteristics to the electric field distribution and low elevation radiation pattern of the wideband antenna elements of FIGS. 7 to 9. Meanwhile, the electric field distribution and radiation pattern will be described in relation to a wideband antenna structure of FIGS. 12 and 13. In this regard, FIG. 15 shows electric field distributions formed on the antenna pattern and ground pattern of FIGS. 12 and 13. Meanwhile, FIG. 16 shows 3D radiation patterns formed by an antenna structure of FIGS. 12 and 13.

Referring to FIGS. 12 to 13 and (a) of FIG. 15, similarly to FIG. 10A, an electric field intensity in a first radiation region RR1*a* of the connection pattern 1111 and the second extended pattern 1112 is formed to be higher than that of the surrounding region. Therefore, the antenna element operates in (a first sub-band in) the first band by the connection pattern 1111 and the first extended pattern 1112. Meanwhile, an electric field intensity in the first radiation region RR1*b* of the connection pattern 1111 and the fourth ground pattern 1154 is formed to be higher than that of the surrounding region. Therefore, the antenna element operates in (a second sub-band in) the first band by the connection pattern 1111 and the fourth ground pattern 1154.

Accordingly, a bandwidth of the first band may be extended by varying the electrical lengths of the first extended pattern 1112 and the fourth ground pattern 1154. Additionally, a bandwidth of the first band may be extended by a current distribution formed along the first extended pattern 1112 and the fourth ground pattern 1154. In this regard, the antenna structure of FIGS. 12 and 13 may further extend a bandwidth of the first band, which is a low band, compared to the antenna structure of FIGS. 7 to 9.

Referring to FIGS. 12 to 13 and (a) of FIG. 15, similar to FIG. 10B, an electric field intensity in a second radiation region of the connection pattern 1111 and the second extended pattern 1113 is formed to be higher than that of the surrounding region. Therefore, the antenna element operates in the second band by the connection pattern 1111 and the second extended pattern 1113.

Referring to FIGS. 12 to 13 and (c) of FIG. 15, similar to FIG. 10C, an electric field intensity in a third radiation region of the third ground pattern 1152 and the second extended pattern 1113 is formed to be higher than that of the surrounding region. Therefore, the antenna element operates in the third band by the second ground pattern 1152 and the second extended pattern 1113.

Meanwhile, referring to FIGS. 12, 13, and (a) of FIG. 16, a wireless signal is radiated to a front region, which is a first region, and a rear region, which is a second region, of the antenna pattern 1100 in the first band (2.4 GHz band). Accordingly, the antenna pattern 1100 forms a low elevation beam pattern in which a beam peak is formed at a predetermined angle in an elevation direction with respect to a bottom surface of the PCB. In this regard, in addition to a mirror structure of the second extended pattern 1113 and the second ground pattern 1152, the first extended pattern 1112 also forms a mirror structure with the fourth ground pattern 1154. Therefore, a radiation pattern according to the embodiment of FIGS. 12 and 13 may be implemented to have more symmetry in the first and second regions than that according to the embodiment of FIGS. 7 to 9.

Referring to FIGS. 12, 13, and (b) of FIG. 16, a wireless signal is radiated to a front region, which is a first region, and a rear region, which is a second region, of the antenna pattern 1100 in the second band (5.4 GHz band). Accordingly, the antenna pattern 1100 forms a low elevation beam pattern in which a beam peak is formed at a predetermined angle in an elevation direction with respect to a bottom surface of the PCB. Since the second band is a higher frequency band than the first band, the radiation pattern of the second band may be implemented to have a higher gain (directivity) than that of the first band.

Referring to FIGS. 12, 13, and (c) of FIG. 16, a wireless signal is radiated to a front region, which is a first region, and a rear region, which is a second region, of the antenna pattern 1100 in the third band (6.4 GHz band). Accordingly, the antenna pattern 1100 forms a low elevation beam pattern in which a beam peak is formed at a predetermined angle in an elevation direction with respect to a bottom surface of the PCB. Since the third band is a higher frequency band than the first band, the radiation pattern of the third band may be implemented to have a higher gain (directivity) than that of the first band.

Figure 17:
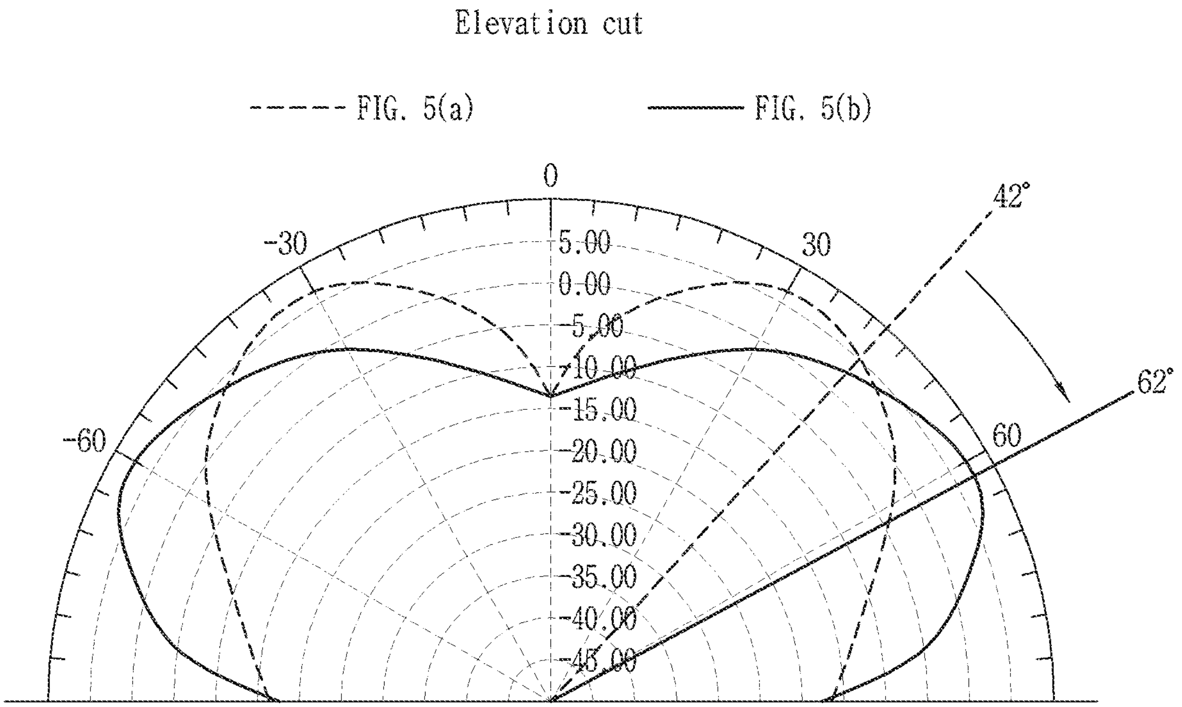
FIG. 17 shows antenna radiation patterns according to antenna structures in (a) and (b) of FIG. 5 in an elevation angle direction.

Meanwhile, the wideband antenna structure presented herein may implement a low elevation radiation pattern by using an antenna pattern and a ground pattern disposed on the first and second sides of the antenna PCB 1200*a* as a radiator. In this regard, FIG. 17 shows antenna radiation patterns according to antenna structures in (a) and (b) of FIG. 5 in an elevation angle direction. Referring to FIGS. 16 and 17, in the first to third bands, the antenna radiation pattern has a beam peak formed at a predetermined angle in an elevation angle direction with respect to the horizontal plane. Meanwhile, the antenna module mounted on the vehicle may be configured such that the beam peak angle is formed at an angle of about 30 degrees or less with respect to a horizontal plane of the vehicle.

Both the antenna structure of FIGS. 7 to 9 and the antenna structure of FIGS. 12 and 13 presented herein have an additional ground G1 disposed on a rear side of the antenna PCB corresponding to the dielectric substrate as shown in (b) of FIG. 5. Referring to FIGS. 5 and 17, as an additional ground G1 is disposed on a rear side of the antenna PCB, the beam peak angle changes from about 42 degrees to 62 degrees with respect to a vertical plane of the vehicle by about 20 degrees toward a horizontal plane. In other words, the beam peak angle may change from about 48 degrees to about 28 degrees with respect to a horizontal plane of the vehicle to implement a low elevation beam pattern. In this regard, both the antenna structure of FIGS. 7 to 9 and the antenna structure of FIGS. 12 and 13 presented herein may implement a low elevation beam pattern as in FIG. 17 by an additional ground G1 as shown in (b) of FIG. 5.

In the above, a wideband antenna element having an antenna pattern and a ground pattern according to this specification and an antenna module including the same have been described. It will be clearly understood by those skilled in the art that various changes and modifications to the aforementioned embodiments related to the antenna module are made without departing from the idea and scope of the present disclosure. Therefore, it should be understood that such various changes and modifications to the implementations fall within the scope of the appended claims.

Hereinafter, a vehicle in which an antenna module including a wideband antenna element having an antenna pattern and a ground pattern according to this specification is disposed will be described.

Figure 18:
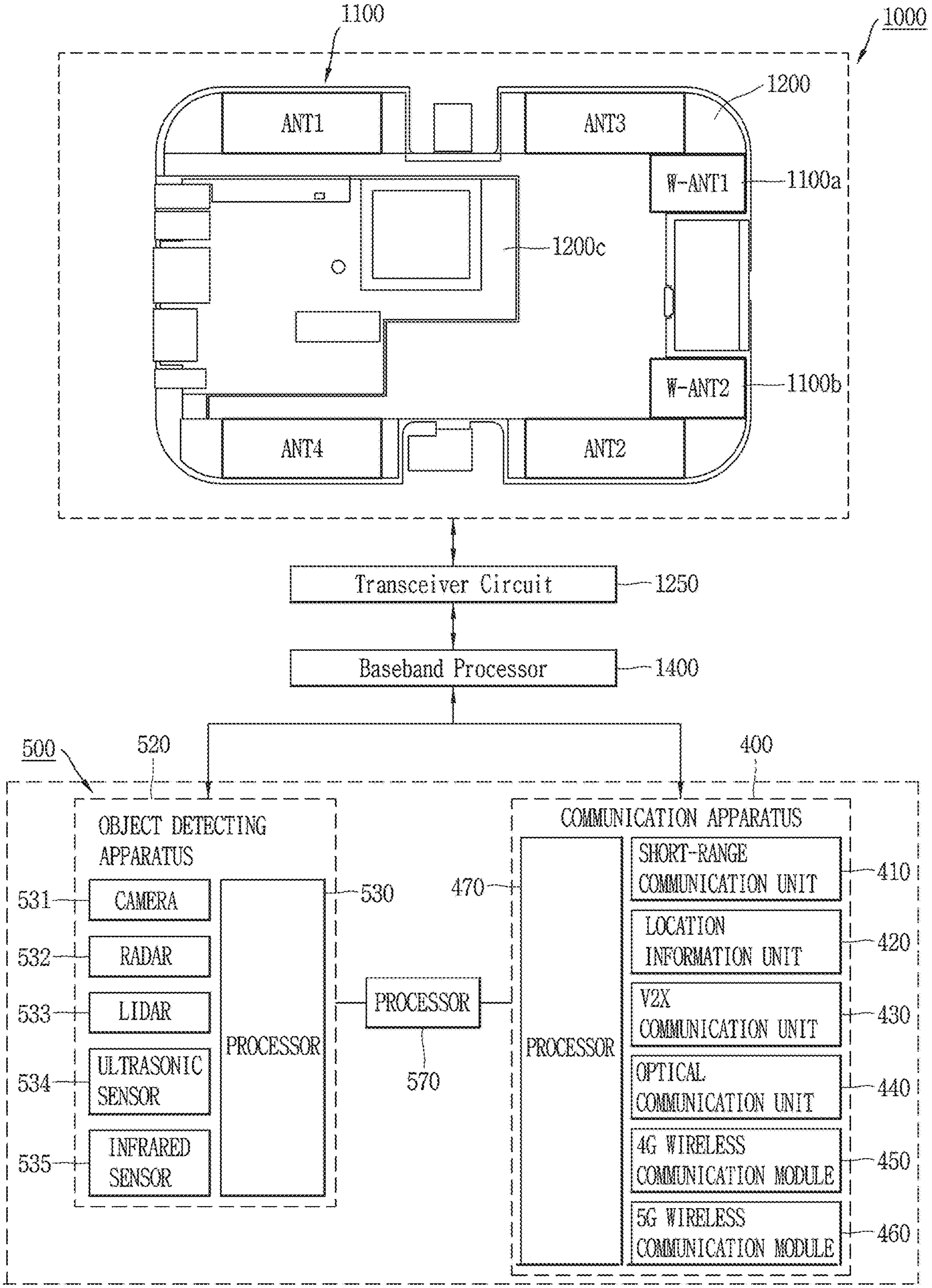
FIG. 18 shows a configuration diagram of an antenna system according to an embodiment and a vehicle on which the antenna system is mounted.

Meanwhile, FIG. 18 shows a configuration diagram of an antenna system according to an embodiment and a vehicle on which the antenna system is mounted. Specifically, FIG. 18 shows a configuration diagram of a vehicle in which an antenna module corresponding to an antenna system is disposed inside a vehicle roof to perform communication with nearby electronic devices, vehicles, and infrastructures.

Referring to FIG. 18, the wideband antenna module 1000 may be mounted on the vehicle. The antenna module 1000 may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna module 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the lidar 533, and the sensors 534 and 535 of the vehicle 300. Alternatively, the baseband processor 1400 may control the communication device 400 and the antenna module 1000 such that a signal is received from or transmitted to the adjacent vehicle, the RSU, the adjacent object, and the base station.

Meanwhile, referring to FIGS. 1A to 18, the vehicle 500 having the antenna module 1000 may include the plurality of antennas 1100, the transceiver circuit 1250, and the base-band processor 1400. The vehicle 500 may further include the object detecting apparatus 520. The vehicle 500 may further include the communication apparatus 400. Here, the communication apparatus 400 may be configured to perform wireless communication through the antenna unit.

Referring to FIGS. 1A to 18, the vehicle 500 may be provided with the antenna module 1000. The antenna module 1000 may be disposed below a roof of the vehicle, and configured to communicate with at least one of an adjacent vehicle, a road side unit (RSU), and a base station through a processor. The antenna module 1000 may perform a telematics operation through wireless communication in the vehicle, and thus may also be referred to as a telematics module. In this regard, the antenna PCB 1200 in the antenna module 1000 may be coupled to a telematics module 1200*c* that performs a telematics function. In this regard, the antenna PCB 1200 and the telematics module 1200*c* may be coupled to interface with each other on the same plane.

Referring to 1A to 18, the vehicle 500 provided with the antenna module 1000 according to another aspect of this specification will be described. The vehicle 500 includes the antenna module 1000 disposed below the roof of the vehicle. The vehicle 500 may further include the processor 1400 disposed inside or outside the antenna module 1000 and configured to communicate with at least one of an adjacent vehicle, a road side unit (RSU), and a base station.

The antenna module 1000 may include a PCB 1200, a bottom cover 1310, a top cover 1320, and an antenna PCB 1200*a*. A printed circuit board (PCB) 1200 may be configured to form a transmission line through which a wireless signal is transmitted. The bottom cover 1310 may be configured such that the PCB 1200 is disposed thereon. The top cover 1320 may be fastened to the bottom cover 1310 to accommodate the PCB 1200 therein.

The antenna PCB 1200*a* may be operably coupled to the PCB 1200. A wireless signal transmitted through a transmission line of the PCB 1200 may be transmitted to the antenna PCB 1200*a*.

A feed line 1120 and an antenna pattern 1110 may be disposed on the first side of the antenna PCB 1200*a*. A ground pattern 1150 may be disposed on the second side of the antenna PCB 1200*a*. It operates as a radiator in a wide band through the antenna pattern 1110 and the ground pattern 1150. Accordingly, the antenna pattern 1110 and the ground pattern 1150 may be referred to as a radiator or an antenna element 1100.

The ground pattern 1150 may include a plurality of conductive patterns. The ground pattern 1150 may include a first ground pattern 1151 and at least one other ground pattern. As an example, the ground pattern 1150 may include a first ground pattern 1151 and a second ground pattern 1152. As another example, the ground pattern 1150 may include a first ground pattern 1151 and a third ground pattern 1153. As still another example, the ground pattern 1150 may include a first ground pattern 1151, a second ground pattern 1152, and a third ground pattern 1153. As still another example, the ground pattern 1150 may include a first ground pattern 1151, a second ground pattern 1152, a third ground pattern 1153, and a fourth ground pattern 1154.

The first ground pattern 1151 may be disposed to have a first width W1 that is larger than a width of the feed line 1120 in a region where the feed line 1120 is disposed. The second ground pattern 1152 may be disposed to extend from one end portion of the first ground pattern 1151 as shown in FIGS. 7 to 9. As another example, the second ground pattern 1152 may be disposed to be spaced apart from one end portion of the first ground pattern 1151 as shown in FIGS. 12 and 13.

The third ground pattern 1153 may extend in a bending manner from one end portion of the second ground pattern 1152. The third ground pattern 1153 may be disposed perpendicular to the second ground pattern 1152. In the antenna structure of FIGS. 12 and 13, the fourth ground pattern 1154 may extend in a bending manner from one end portion of the third ground pattern 1153. The fourth ground pattern 1154 may be disposed perpendicular to the third ground pattern 1153.

The antenna pattern 1110 may include a plurality of conductive patterns. The antenna pattern 1110 may include a connection pattern 1111 and one or more extended patterns. The antenna pattern 1110 may include a connection pattern 1111 and a first extended pattern 1112. As another example, the antenna pattern 1110 may include a connection pattern 1111 and a second extended pattern 1113. As still another example, the antenna pattern 1110 may include a connection pattern 1111, a first extended pattern 1112, and a second extended pattern 1113.

The connection pattern 1111 is configured to be connected to the feed line 1120 on the first side, that is, the front side, of the antenna PCB 1200*a*. The first extended pattern 1112 may be configured to extend from a first point of the connection pattern 1111 in one direction on the first axis. The second extended pattern 1113 may be configured to extend from a second point of the connection pattern 1111 in the other direction on the first axis. In this regard, the second point where the second extended pattern 1113 is disposed may be a lower region of the antenna PCB 1200*a* than the first point where the first extended pattern 1112 is disposed, but is not limited thereto.

The antenna structure as shown in FIGS. 7 to 9 will be described. The second ground pattern 1152 extends from one end portion of the first ground pattern 1151 and is disposed to have a second width in the first axis direction and a second length in the second axis direction. The third ground pattern 1153 is disposed to have a third width in the second axis direction and a third length in the first axis direction.

The first extended pattern 1112 is disposed to have a first length from a first point of the connection pattern 1111 in one direction on the first axis, and configured to radiate a wireless signal in a first band. The second extended pattern 1113 is bent at one end portion of the connection pattern 1111, disposed to have a second length in the other direction on the first axis, and configured to radiate a wireless signal in a second band higher than the first band. The direction of a first current formed in the second extended pattern 1113 and the direction of a second current formed in the third ground pattern 1153 are formed in the same direction. The second extended pattern 1113 and the third ground pattern 1153 are configured to operate in a third band higher than the second band due to the first current and the second current.

An antenna structure in which a mirror structure is also disposed at an end portion of the connection pattern 1111 as shown in FIGS. 12 and 13 will be described. The ground pattern 1150 may further include a fourth ground pattern 1154 that extends in a bending manner from one end portion of the third ground pattern 1153 and is disposed perpendicular to the third ground pattern 1153. The second ground pattern 1152 is spaced apart from one end portion of the first ground pattern 1151 and disposed to have a predetermined length in a first axis direction parallel to the first ground pattern 1151.

The fourth ground pattern 1154 extends from the third ground pattern 1153 at a point corresponding to a first point where the first extended pattern 1112 is disposed. The fourth ground pattern 1154 is disposed in the other direction on the first axis. The direction of a first current formed in the second extended pattern 1113 and the direction of a second current formed in the second ground pattern 1152 are formed in the same direction. The second extended pattern 1113 and the third ground pattern 1152 are configured to operate in a third band higher than the second band due to the first current and the second current.

Several types of antenna elements may be disposed in the antenna module 1000. Each type of antenna element may also be implemented with a plurality of antenna elements to implement multi-input multi-output (MIMO). A plurality of antennas may be provided for 4G/5G communication. The plurality of antennas may include a first antenna (ANT1) and a second antenna (ANT2). The plurality of antennas may include a third antenna (ANT3) and a fourth antenna (ANT4).

Meanwhile, the plurality of antennas may be disposed for WiFi communication. As an example, the plurality of antennas for WiFi communication may include a first antenna (W-ANT1) 1100*a* and a second antenna (W-ANT2) 1100*b*. Therefore, the antenna module 1100 may include the first antenna (W-ANT1) 1100*a* and the second antenna (W-ANT2) 1100*b* consisting of the antenna pattern 1110 and the ground pattern 1150. Locations where the first antenna (W-ANT1) 1100*a* and the second antenna (W-ANT2) 1100*b* are disposed are not limited to specific locations on the antenna PCB 1200*a* of FIG. 16 and may be changed depending on the application.

The processor 1400 may control to perform multi-input multi-output (MIMO) in the first band through the first antenna (W-ANT1) 1100*a* and the second antenna (W-ANT2) 1100*b*. The processor 1400 may control to perform to transmit and receive a signal in the first band only through the first antenna (W-ANT1) 1100*a* and the second antenna (W-ANT2) 1100*b*. Therefore, the processor 1400 may switch between a multiple transmission mode such as a MIMO mode and a single transmission mode in the first band depending on the communication environment.

The processor 1400 may control to perform multi-input multi-output (MIMO) in a second band and/or a third band higher than the first band through the first antenna (W-ANT1) 1100*a* and the second antenna (W-ANT2) 1100*b*. The processor 1400 may control to perform multi-input multi-output (MIMO) in the second band and/or the third band through the first antenna (W-ANT1) 1100*a* or the second antenna (W-ANT2) 1100*b*. Therefore, the processor 1400 may switch between a multiple transmission mode such as a MIMO mode and a single transmission mode in the second band and/or the third band depending on the communication environment.

The transceiver circuit 1250 may be operably coupled to each radiator module 1100. The processor 1400 may be operably coupled to the transceiver circuit 1250. The processor 1400 may be a baseband processor corresponding to a modem, but is not limited thereto and may be any processor that controls the transceiver circuit 1250. The processor 1400 of the vehicle may be implemented as a network access device (NAD).

The transceiver circuit 1250 may be operably coupled to the MIMO antennas ANT1 to ANT4. The transceiver circuit 1250 may include a front end module (FEM) such as a power amplifier or a receiving amplifier. As another example, the front end module (FEM) may be disposed between the transceiver circuit 1250 and the antenna, separately from the transceiver circuit 1250. The transceiver circuit 1250 may control the amplitude and/or phase of signals transmitted to the MIMO antennas ANT1 to ANT4 or control only some antenna modules to operate by adjusting the gain or input or output power of the power amplifier or the receiving amplifier.

The processor 1400 may be operably coupled to the transceiver circuit 1250 and may be configured to control the transceiver circuit 1250. The processor 1400 may control the transceiver circuit 1250 to control the amplitude and/or phase of the signals transmitted to the MIMO antennas ANT1 to ANT4 or to operate only some antenna modules. The processor 1400 may perform communication with at least one of the adjacent vehicle, the road side unit (RSU), and the base station through the transceiver circuit 1250.

In a case where there is a need to simultaneously receive information from various entities such as the adjacent vehicle, the RSU, and the base station for autonomous driving, etc., information may be received and transmitted through MIMO. Therefore, the vehicle may receive different information from various entities at the same time to improve its communication capacity. Therefore, the communication capacity of the vehicle can be improved through the MIMO without increasing a bandwidth.

Alternatively, the vehicle may simultaneously receive the same information from various entities, so as to improve reliability of surrounding information and decrease latency. Accordingly, Ultra Reliable Low Latency Communication (URLLC) can be performed in the vehicle and the vehicle can operate as a URLLC UE. To this end, a base station that performs scheduling may preferentially allocate a time slot for the vehicle operating as the URLLC UE. For this purpose, some of specific time-frequency resources already allocated to other UEs may be punctured.

As described above, the plurality of antennas ANT1 to ANT4 for 4G/5G communication within the antenna module 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the mid band (MB) is referred to as a first (frequency) band and the high band (HB) is referred to as a second (frequency) band. The 5G sub-6 band may be the same band as the LTE band in case of LTE re-farming. When 5G NR operates in a band separate from LTE, it may operate in the high band (HB) or a higher band. The 5G sub-6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuit 1250 to receive the second signal in the second band while receiving the first signal in the first band through one of the first to fourth antennas ANT1 to ANT4. In this case, there may be provided an advantage that the baseband processor 1400 can advantageously perform carrier aggregation (CA) through one antenna.

Alternatively, the baseband processor 1400 may control the transceiver circuit 1250 to receive the second signal in the second band through one of the third antenna ANT3 and the fourth antenna ANT4 while receiving the first signal in the first band through one of the first antenna ANT1 and the second antenna ANT2. In this case, there may be provided an advantage that each antenna can be designed to optimally operate in a corresponding band.

Therefore, the baseband processor 1400 may perform carrier aggregation (CA) through a band in which the first frequency band and the second frequency band are combined. When it is necessary to receive a large amount of data for autonomous driving or the like, reception in a broad band may be allowed through the CA.

Accordingly, eMBB (Enhanced Mobile Broad Band) communication can be performed in the vehicle and the vehicle can operate as an eMBB UE. To this end, the base station that performs scheduling may allocate a wideband frequency resource to the vehicle that operates as the eMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuit 1250 to perform carrier aggregation in two or more of the first to third bands based on the allocated resource region.

The processor 1400 may perform MIMO in an EN-DC state through the first to fourth antennas ANT1 to ANT4. For example, the processor 1400 may perform an EN-DC operation through the first antenna ANT1 and the second antenna ANT2, and MIMO through the third antenna ANT3 and the fourth antenna ANT4.

In this regard, when the EN-DC operation is performed between the 4G/5G communication system and the WiFi communication system using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

In the above, an antenna module having a wideband antenna element disposed in a vehicle according to this specification and a vehicle equipped with the antenna module have been described.

The technical effects of such an antenna module having a wideband antenna element in a vehicle and a vehicle equipped with the antenna module will be described as follows.

According to this specification, a wideband antenna structure consisting of an antenna pattern and a ground pattern may be presented to perform a wideband operation while being disposed in a vehicle.

According to this specification, a wideband antenna structure disposed in a vehicle may be presented to provide WiFi 6 and WiFi 7 communication services in the vehicle.

According to this specification, a ground pattern may be disposed in a lower region of the antenna pattern to provide a vehicle antenna structure capable of implementing a low elevation beam pattern.

According to this specification, an antenna element may be implemented on a PCB and a separate antenna board capable of optimizing antenna performance to provide a high-efficiency wideband antenna element with high antenna gain while operating in a wide bandwidth.

According of this specification, it may be possible to maintain antenna performance at a predetermined level and maintain a low elevation beam pattern even in a case where the exterior of a vehicle body or roof is made of a metallic material.

According to this specification, it may be possible to improve antenna performance of an antenna system while maintaining a height of the antenna system at a predetermined level or less as well as maintaining a low elevation beam pattern.

According to this specification, a structure for mounting an antenna system capable of operating in a wideband on a vehicle to support various communication systems may be presented.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the foregoing description, the antenna module mounted in the vehicle and the operation of controlling the same may be implemented by software, firmware, or a combination thereof. Meanwhile, the design of the antenna system mounted in the vehicle and the configuration of controlling the antenna system may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. An antenna module mounted on a vehicle, the antenna module comprising:

a printed circuit board (PCB) having a transmission line disposed thereon; and an antenna PCB coupled to the PCB, the antenna PCB having a feed line and an antenna pattern disposed on a first side of the antenna PCB and a ground pattern disposed on a second side of the antenna PCB, wherein the ground pattern comprises:

a first ground pattern disposed in a region where the feed line is disposed to have a first width larger than a width of the feed line;

a second ground pattern extending from one end portion of the first ground pattern to be disposed to have a second width in a first axis direction and a second length in a second axis direction; and a third ground pattern extending in a bending manner from one end portion of the second ground pattern to be disposed to have a third width in the second axis direction and a third length in the first axis direction.

2. The antenna module of claim 1, wherein the antenna pattern comprises:

a connection pattern connected to the feed line on the first side of the antenna PCB;

a first extended pattern extending from a first point of the connection pattern in one direction on a first axis; and a second extended pattern extending from a second point of the connection pattern in another direction on the first axis.

3. The antenna module of claim 2, wherein the first extended pattern is disposed to have a first length from a first point of the connection pattern in one direction on the first axis, and configured to radiate a wireless signal in a first band.

4. The antenna module of claim 3, wherein the second extended pattern is disposed to have a second length from a second point of the connection pattern in the other direction on the first axis, and configured to radiate a wireless signal in a second band higher than the first band.

5. The antenna module of claim 4, wherein a point where the third ground pattern is bent is a point corresponding to the second point where the second extended pattern is disposed, and wherein the second extended pattern is disposed to have a first length in one direction on the first side of the antenna PCB, and the third ground pattern is disposed to have a third length in the other direction on the second side of the antenna PCB.

6. The antenna module of claim 5, wherein the direction of a first current formed in the second extended pattern and the direction of a second current formed in the third ground pattern are formed in a same direction, and wherein the second extended pattern and the third ground pattern are configured to operate in a third band different from the second band by the first current and the second current.

7. The antenna module of claim 6, wherein the antenna PCB forms a first beam at an angle spaced apart by a predetermined angle with respect to the PCB by the connection pattern, the first extended pattern, and the second extended pattern disposed on the first side of the antenna PCB, and forms a second beam at an angle spaced apart by a predetermined angle with respect to the PCB by the ground pattern disposed on the second side of the antenna PCB, and wherein an antenna beam tilted by a predetermined angle with respect to a bottom surface of a bottom cover of the antenna module by the first beam and the second beam is radiated in front and rear directions of the antenna PCB.

8. The antenna module of claim 2, wherein the antenna pattern disposed on the first side of the antenna PCB and the ground pattern disposed on the second side of the antenna PCB are interconnected by a vertical connection structure.

9. The antenna module of claim 8, wherein the second extended pattern and the third ground pattern are connected vertically by a via hole at one point in a region where the antenna pattern and the ground pattern overlap.

10. An antenna module mounted on a vehicle, the antenna module comprising:

a printed circuit board (PCB) PCB-having a transmission line disposed thereon;

a bottom cover in which the PCB is disposed;

a top cover fastened to the bottom cover to accommodate the PCB therein; and an antenna PCB coupled to the PCB, the antenna PCB having a feed line and an antenna pattern disposed on a first side of the antenna PCB and a ground pattern disposed on a second side of the antenna PCB, wherein the ground pattern comprises:

a first ground pattern disposed in a region where the feed line is disposed to have a first width larger than a width of the feed line;

a second ground pattern spaced apart from one end portion of the first ground pattern and disposed to have a predetermined length in a first axis direction parallel to the first ground pattern;

a third ground pattern extending in a bending manner from one end portion of the second ground pattern to be disposed perpendicular to the second ground pattern; and a fourth ground pattern extending in a bending manner from one end portion of the third ground pattern to be disposed perpendicular to the third ground pattern.

11. The antenna module of claim 10, wherein the antenna pattern comprises:

a connection pattern connected to the feed line on the first side of the antenna PCB;

a first extended pattern extending from a first point of the connection pattern in one direction on a first axis; and a second extended pattern extending from a second point of the connection pattern in another direction on the first axis.

12. The antenna module of claim 11, wherein the first extended pattern is disposed to have a first length from a first point of the connection pattern in one direction on the first axis, and configured to radiate a wireless signal in a first band.

13. The antenna module of claim 12, wherein the second extended pattern is bent at one end portion of the connection pattern, disposed to have a second length in the other direction on the first axis, and configured to radiate a wireless signal in a second band higher than the first band.

14. The antenna module of claim 13, wherein a point where the second ground pattern is disposed is a point corresponding to the second point where the second extended pattern is disposed, and wherein the second extended pattern is disposed to have a first length in one direction on the first side of the antenna PCB, and the second ground pattern is disposed to have a second length in the other direction on the second side of the antenna PCB.

15. The antenna module of claim 14, wherein the direction of a first current formed in the second extended pattern and the direction of a second current formed in the second ground pattern are formed in a same direction, and wherein the second extended pattern and the second ground pattern are configured to operate in a third band higher than the second band by the first current and the second current.

16. The antenna module of claim 12, wherein the fourth ground pattern extends from the third ground pattern at a point corresponding to the first point where the first extended pattern is disposed, and the fourth ground pattern is disposed in the other direction on the first axis.

17. A vehicle having an antenna module, the vehicle comprising:

an antenna module disposed below a roof of the vehicle; and a processor disposed inside or outside the antenna module, and configured to communicate with at least one of an adjacent vehicle, a road side unit (RSU), or a base station, wherein the antenna module further comprises:

a printed circuit board (PCB) having a transmission line disposed thereon;

a bottom cover in which the PCB is disposed;

a top cover fastened to the bottom cover to accommodate the PCB therein; and an antenna PCB coupled to the PCB, the antenna PCB having a feed line and an antenna pattern disposed on a first side the antenna PCB and a ground pattern disposed on a second side the antenna PCB, wherein the ground pattern comprises:

a first ground pattern disposed in a region where the feed line is disposed to have a first width larger than a width of the feed line;

a second ground pattern extending from one end portion of the first ground pattern or disposed to be spaced apart therefrom; and a third ground pattern extending in a bending manner from one end portion of the second ground pattern to be disposed perpendicular to the second ground pattern, and wherein the antenna pattern comprises:

a connection pattern connected to the feed line on the first side the antenna PCB;

a first extended pattern extending from a first point of the connection pattern in one direction on a first axis; and a second extended pattern extending from a second point of the connection pattern in another direction on the first axis.

18. The vehicle of claim 17, wherein the second ground pattern extends from one end portion of the first ground pattern, and is disposed to have a second width in a first axis direction and a second length in a second axis direction, wherein the third ground pattern is disposed to have a third width in the second axis direction and a third length in the first axis direction, wherein the first extended pattern is disposed to have a first length from a first point of the connection pattern in one direction on the first axis, and configured to radiate a wireless signal in a first band, wherein the second extended pattern is bent at one end portion of the connection pattern, disposed to have a second length in the other direction on the first axis, and configured to radiate a wireless signal in a second band higher than the first band, wherein the direction of a first current formed in the second extended pattern and the direction of a second current formed in the third ground pattern are formed in a same direction, and wherein the second extended pattern and the third ground pattern are configured to operate in a third band higher than the second band by the first current and the second current.

19. The vehicle of claim 18, wherein the ground pattern further comprises a fourth ground pattern extending in a bending manner from one end portion of the third ground pattern to be disposed perpendicular to the third ground pattern, wherein the second ground pattern is spaced apart from one end portion of the first ground pattern and disposed to have a predetermined length in a first axis direction parallel to the first ground pattern, wherein the fourth ground pattern extends from the third ground pattern at a point corresponding to the first point where the first extended pattern is disposed, and the fourth ground pattern is disposed in the other direction on the first axis, wherein the direction of a first current formed in the second extended pattern and the direction of a second current formed in the second ground pattern are formed in the same direction, and wherein the second extended pattern and the third ground pattern are configured to operate in a third band higher than the second band by the first current and the second current.

20. The vehicle of claim 19, wherein the antenna module comprises a first antenna and a second antenna consisting of a slot radiator and the second radiator, and wherein the processor controls to perform multi-input multi-output (MIMO) in a first band through the first antenna and the second antenna, and controls to perform multi-input multi-output (MIMO) in a second band higher than the first band through the first antenna and the second antenna.

* * * * *